(12) United States Patent
Sumida et al.

(10) Patent No.: US 7,252,318 B2
(45) Date of Patent: Aug. 7, 2007

(54) SEAT DEVICE FOR VEHICLE

(75) Inventors: Kazue Sumida, Hiroshima (JP); Akira Ito, Hiroshima (JP); Minoru Toyota, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 13 days.

(21) Appl. No.: 11/063,980

(22) Filed: Feb. 24, 2005

(65) Prior Publication Data

US 2005/0218684 A1   Oct. 6, 2005

(30) Foreign Application Priority Data

Mar. 30, 2004  (JP) ............................. 2004-099921
Mar. 30, 2004  (JP) ............................. 2004-099922
Mar. 30, 2004  (JP) ............................. 2004-099928
Mar. 30, 2004  (JP) ............................. 2004-099929

(51) Int. Cl.
*B60N 2/01* (2006.01)

(52) U.S. Cl. .................................................. 296/64

(58) Field of Classification Search ............... 296/64
See application file for complete search history.

(56) References Cited

U.S. PATENT DOCUMENTS

| 1,306,498 | A | * | 6/1919 | Moses .......................... 296/64 |
| 4,842,318 | A | * | 6/1989 | Fussnegger et al. ............ 296/64 |
| 5,407,166 | A | * | 4/1995 | Pilarski ....................... 248/430 |
| 6,457,765 | B1 | * | 10/2002 | Bergquist et al. .............. 296/64 |
| 2002/0021016 | A1 | | 2/2002 | Berguist et al. |
| 2002/0047287 | A1 | * | 4/2002 | Kawasaki ....................... 296/64 |

FOREIGN PATENT DOCUMENTS

| EP | 1 468 880 | 10/2004 |
| FR | 1.059.830 | 4/1995 |
| JP | 55019608 | 2/1980 |
| JP | 03-235729 | 10/1991 |

OTHER PUBLICATIONS

European Search Report.

* cited by examiner

*Primary Examiner*—Dennis H. Pedder
(74) *Attorney, Agent, or Firm*—Nixon Peabody LLP; Donald R. Studebaker

(57) ABSTRACT

In a seat device for a vehicle comprising a front-row seat including a driver seat and an assistant seat and a rear-row seat provided behind the front-row seat, respective front-row and rear-row seats being provided in a cabin which includes an ingress and egress opening, at a side face, the rear-row seat is configured so as to be located in a normal use position and in a stored position where a longitudinal thickness thereof is made short, and the assistant seat is configured so as to be moved rearward from a position beside the driver seat to a position which corresponds to the normal use position of the rear-row seat.

Accordingly, a space in the cabin properly can be utilized, by effectively enlarging a rearward-movement range of the front-row seat including the assistant seat with a simple structure.

19 Claims, 27 Drawing Sheets

SEAT DEVICE FOR VEHICLE

BACKGROUND OF THE INVENTION

The present invention relates to a seat device for a vehicle, in which there are provided a front-row seat and a rear-row seat in a cabin which includes an ingress and egress opening at a side face.

Conventionally, for example, as disclosed in Japanese Patent Laid-Open Publication No. 03-235729, it is known that a middle-row seat located between a front-row seat and a rear-row seat is removed at need so as to provide a large space between the seats in a so-called one-box type of vehicle or the like, in which the rear-row (rear) seat is moved forward along a lower rail with its seat cushion being located in a sitting position, while the rear-row seat with its seat cushion being rotated upward is moved forward to form a wide load space behind the cabin.

Also, as disclosed in U.S. Pat. No. 5,605,368, a seat slide device of an automotive vehicle is known, in which a movement range of a first-rear-row seat and a second-rear-row seat, which are supported so as to be moved in a longitudinal direction of the vehicle along a rail member, is enlarged so as to increase the seat arrangement patterns, by locating seat backs of the first-rear-row and second-rear-row seats in their upright positions for sitting, in their rearward-reclined flat positions and in their forward-folded positions, respectively.

The above-described structure, as disclosed in the former patent publication, in which the middle-row seat located between the front-row seat and the rear-row seat is removed at need, has advantage of providing the large space between the front-row seat and the rear-row seat, while it has disadvantages that the removal of the middle-row seat would require somewhat complicated operations and a particular space for storing it, and also an operation for attaching the removed middle-row seat to the vehicle body would be necessary for using it again.

Meanwhile, the above-described structure, as disclosed in the latter patent publication, in which the first-rear-row seat is moved rearward closely to the font end of the second-rear-row seat, has advantage that a relatively large and useful space can be provided between the foremost driver seat or assistant seat and the first-rear-row seat and this space can be used properly. However, since the rearward-movement range of the first-rear-row seat is so limited by the front end portion of the second-rear-row seat that the first-rear-row could not be moved rearward further sufficiently, it would be required that the seat arrangement patterns of passenger seats is increased.

SUMMARY OF THE INVENTION

The present invention has been devised in view of the above-described problems, and an object of the present invention is to provide a seat device for a vehicle which can utilize a space in the cabin properly, by effectively enlarging a rearward-movement range of the front-row seat including the assistant seat with a simple structure, and provide a large and useful space for a passenger sitting on the front-row seat.

According to the present invention, there is provided a seat device for a vehicle, comprising a front-row seat including a driver seat and an assistant seat, a rear-row seat provided behind the front-row seat, respective front-row and rear-row seats being provided in a cabin which includes an ingress and egress opening at a side face, wherein the rear-row seat is configured so as to be respectively located in a normal use position and in a stored position where a longitudinal thickness thereof is made short, and the assistant seat is configured so as to be moved rearward from a position beside the driver seat to a position which corresponds to the normal use position of the rear-row seat.

Accordingly, since the rearward-movement range of the assistant seat is enlarged without having any complicated operations such as a removal of the rear-row seat behind the assistant seat and the assistant seat is moved rearward to the position corresponding to the normal use state of the rear-row seat, there can be provided properly the large and useful space beside the driver seat and before the assistant seat.

According to a preferred embodiment, the rear-row seat is configured such that the longitudinal thickness thereof is made short with a seat cushion of the rear-row seat being rotated upward.

Accordingly, the longitudinal thickness of the rear-row seat behind the assistant seat can be made short and the rearward-movement of the assistant seat can be extremely enlarged, by just rotating the seat cushion of the rear-row seat upward.

According to another preferred embodiment, the rear-row seat is configured so as to be further located in a lower stored position with a seat back of the rear-row seat being folded on the seat cushion of the rear-row seat, whereby the assistant seat can be moved rearward further when the rear-row seat is located in the lower stored position.

Accordingly, the larger space can be formed beside the driver seat and before the assistant seat, by moving the assistant seat rearward when the rear-row seat is located in the lower stored position with its seat back being folded on its seat cushion.

According to another preferred embodiment, there are provided a plurality of independent rear seats, and the independent rear seats are configured so as to be located in stored positrons thereof separately.

Accordingly, the independent rear seat behind the driver seat remains in the normal use position, the assistant seat in the stored position is moved rearward to the position corresponding to the normal use position of the independent rear seat in the stored position, and the assistant seat is located beside the independent rear seat. Thus, plural passengers can sit side by side on the assistant seat and the independent rear seat, with the large space formed in front of the assistant seat.

According to another preferred embodiment, a continuous sitting face is formed by a seat cushion of the assistant seat and a seat cushion of the independent rear seat behind the driver seat when another independent rear seat behind the assistant seat is located in the stored position and the assistant seat is moved rearward, whereby the seat cushion of the assistant seat and the seat cushion of the independent rear seat can be located at substantially the same level.

Accordingly, since the both seat cushions of the assistant seat and the independent rear seat behind the driver seat are used integrally so as to create the continuous sitting face thereby, the seat utility of the vehicle can be improved effectively.

According to another preferred embodiment, the assistant seat is configured so as to be located in a stored position where a longitudinal thickness thereof is made short with a seat cushion of the assistant seat being rotated upward.

Accordingly, since the longitudinal thickness of the assistant seat is made short by rotating the seat cushion of the assistant seat upward, patterns of seat arrangement of the passenger seats can be increased effectively.

According to another preferred embodiment, the assistant seat located in the stored position is configured so as to be moved forward closely to an instrument panel.

Accordingly, there can be provided a large space beside the driver seat and in back of the assistant seat, by moving the assistant seat in the stored position forward closely to the instrument panel.

According to another preferred embodiment, a child seat is available on the assistant seat.

Accordingly, there can be provided a proper seat arrangement which would make it easy for the passenger sitting on the independent rear seat behind the deriver seat to take care of a child in the child seat, by moving the assistant seat equipped with the child seat to the position corresponding to the normal use position of the independent rear seat behind the assistant seat. Also, the safety of the child seat can be improved by locating the child seat at the rear of the vehicle.

According to another preferred embodiment, there is provided a seat belt mechanism which is configured so as to be applicable to passengers sitting on the rear-row seat and the assistant seat located in the rearward-moved position.

Accordingly, since the single seat belt mechanism protects both passengers sitting on the rear-row seat in the normal use position and the assistant seat located in the rearward-movement position, the protection of passengers can be properly attained.

According to another preferred embodiment, the belt mechanism comprises a retractor which retracts a seat belt, an anchor which supports the seat belt from the retractor at an upper side of the vehicle, and a buckle which fixes a front end of the seat belt to a vehicle body, and the seat belt mechanism is located so as to protect the passengers sitting on the rear-row seat and the assistant seat located in the rearward-moved position.

Accordingly, when the assistant seat is located beside the driver seat in its normal use position, the passenger sitting on the rear-row seat behind the assistant seat can be protected by the seat belt mechanism in which the seat belt from the retractor is supported by the anchor provided at the upper side of the vehicle and the front end of the seat belt is fixed to the vehicle body by the buckle. Also, when the assistant seat is moved rearward closely to the rear-row seat, the passenger sitting on the assistant seat can be also protected by the same seat belt mechanism.

According to another preferred embodiment, there is provided a seat rail member which supports the assistant seat so as to move the assistant seat rearward from the position beside the driver seat to the position which corresponds to the normal use position of the rear-row seat.

Accordingly, since the assistant seat is moved rearward closely to the rear-row seat along the seat rail member without having any complicated operations such as the removal of the rear-row seat, there can be provided the large and useful space effectively beside the driver seat and before the assistant seat.

According to another preferred embodiment, the seat rail member includes a seat rail member to support an outside edge portion of the assistant seat, and the seat rail member supporting the outside edge portion of the assistant seat is provided at a side sill which extends in a longitudinal direction of the vehicle at a side portion of the vehicle.

Accordingly, since the seat rail member supporting the outside edge portion of the assistant seat is provided at the side sill as the rigidity member which extends in the longitudinal direction at the side portion of the vehicle, the sufficient supporting rigidity of the seat rail member can be ensured, and the side sill can be reinforced effectively by, for example, welding the seat rail member to the side sill.

According to another preferred embodiment, the seat rail member supporting the outside edge portion of the assistant seat is located in a recess portion which is formed at an inner panel of the side sill.

Accordingly, since the seat rail member is located in the recess portion formed at the inner panel of the side sill, the disposition of the seat rail member can be made stable effectively, and also the seat rail member can be prevented from projecting from the side sill so as to improve the passenger's getting on and off.

According to another preferred embodiment, the recess portion which is formed at the inner panel of the side sill is used as the seat rail member supporting the outside edge portion of the assistant seat.

Accordingly, since the recess portion formed at the inner panel of the side sill is used as the seat rail member supporting the outside edge portion of the assistant seat, the structure can be made simpler and lighter.

According to another preferred embodiment, the seat rail member includes a seat rail member to be provided at a portion of a floor panel, at which a floor frame which extends in a longitudinal direction of the vehicle is provided.

Accordingly, since there is provided the seat rail member to be provided at the portion of the floor panel at which the floor frame extending in the longitudinal direction is provided, the sufficient supporting rigidity of the seat rail member can be ensured.

According to another preferred embodiment, there is provided a floor cross member which extends in a vehicle width direction is provided at a lower face of the floor panel.

Accordingly, since the floor cross member is provided at the lower face of the floor panel, the rigidity of the floor panel which even supports the seat rail member thereon can be increased effectively.

According to another preferred embodiment, the seat rail member includes a seat rail member to support an inside edge portion of the assistant seat, and the seat rail member supporting the inside edge portion of the assistant seat is provided at a tunnel portion which extends in the longitudinal direction of the vehicle at a central portion of the vehicle.

Accordingly, since the seat rail member supporting the inside edge portion of the assistant seat is provided at the tunnel portion as the rigidity member which extends in the longitudinal direction at the central portion of the vehicle, the sufficient supporting rigidity of the seat rail member can be ensured, and the tunnel portion can be reinforced by the seat rail member so as to improve its rigidity by welding the seat rail member to the tunnel portion.

According to another preferred embodiment, there is provided a drive mechanism which moves the rear-row seat to the stored position along with a rearward-movement operation of the assistant seat.

Accordingly, the rear-row seat is located in the stored position with the short longitudinal thickness by moving rearward the assistant seat and the rearward-movement range of the assistant seat is enlarged without having any complicated operations such as the removal of the rear-row seat behind the assistant seat. Also, the assistant seat is moved rearward to the position corresponding to the normal use position of the rear-row seat. Thus, there can be provided properly the large and useful space beside the driver seat and before the assistant seat.

According to another preferred embodiment, there is provided a stopper mechanism which limits the rearward movement of the assistant seat at a point which is close to a seat cushion of the rear-row seat located in the normal use position.

Accordingly, since the rearward movement of the assistant seat is limited by the stopper mechanism at the point which is close to the seat cushion of the rear-row seat located in the normal use position, the assistant seat can be prevented from contacting knees or the like of the passenger sitting on the rear-row seat.

Other features, aspects, and advantages of the present invention will become apparent from the following description which refers to the accompanying drawings.

DETAILED DESCRIPTION OF THE INVENTION

Figure 1:
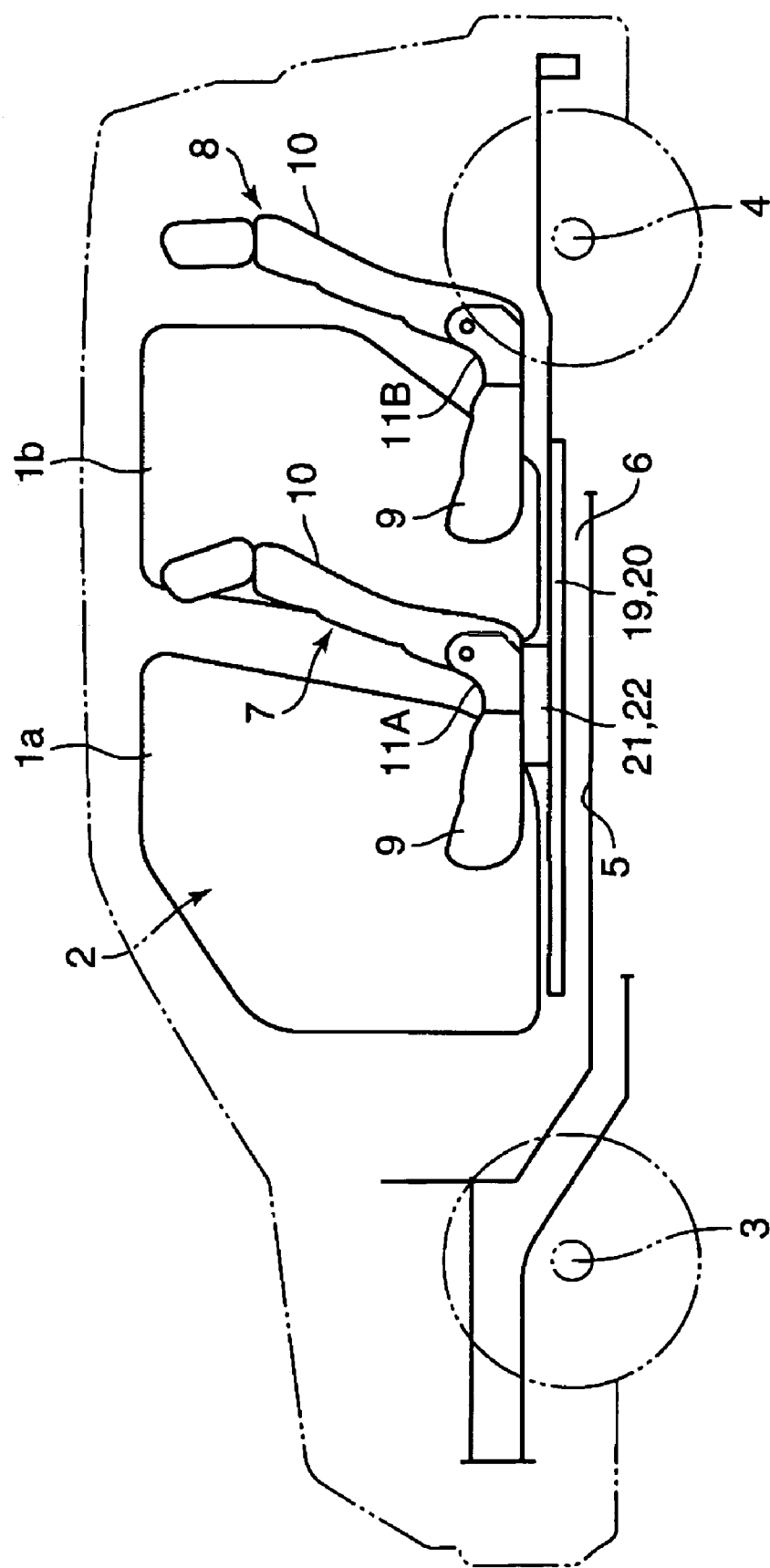
FIG. 1 is a side view illustrating a seat device for a vehicle according to an embodiment of the present invention.

Hereinafter, preferred embodiments of the present invention will be described referring to the accompanying drawings. It should be understood that even though embodiments are separately described, single features thereof may be combined to additional embodiments.

FIG. 1 through 5 illustrate schematic views of a vehicle including a seat device for a vehicle according to a preferred embodiment of the present invention. The vehicle illustrated is a so-called minivan type of vehicle, in which a cabin 2 including a plurality of ingress and egress openings 1a and 1b equipped with a front door and a rear door at its side face is provided between a front-wheel axle 3 and a rear-wheel axel 4. There is provided a floor panel 5 between right and left side sills 6, 6 in the cabin 2, and a plurality of passenger seats 7 and 8 are provided on the floor panel 5. Namely, a front-row seat 7 comprising a driver seat 7a and an assistant seat 7b is disposed at a front portion of the floor panel 5, and a rear-row seat 8 comprising a pair of independent seats 8a and 8b which are disposed side by side is disposed behind the front-row seat 7.

Figure 2:
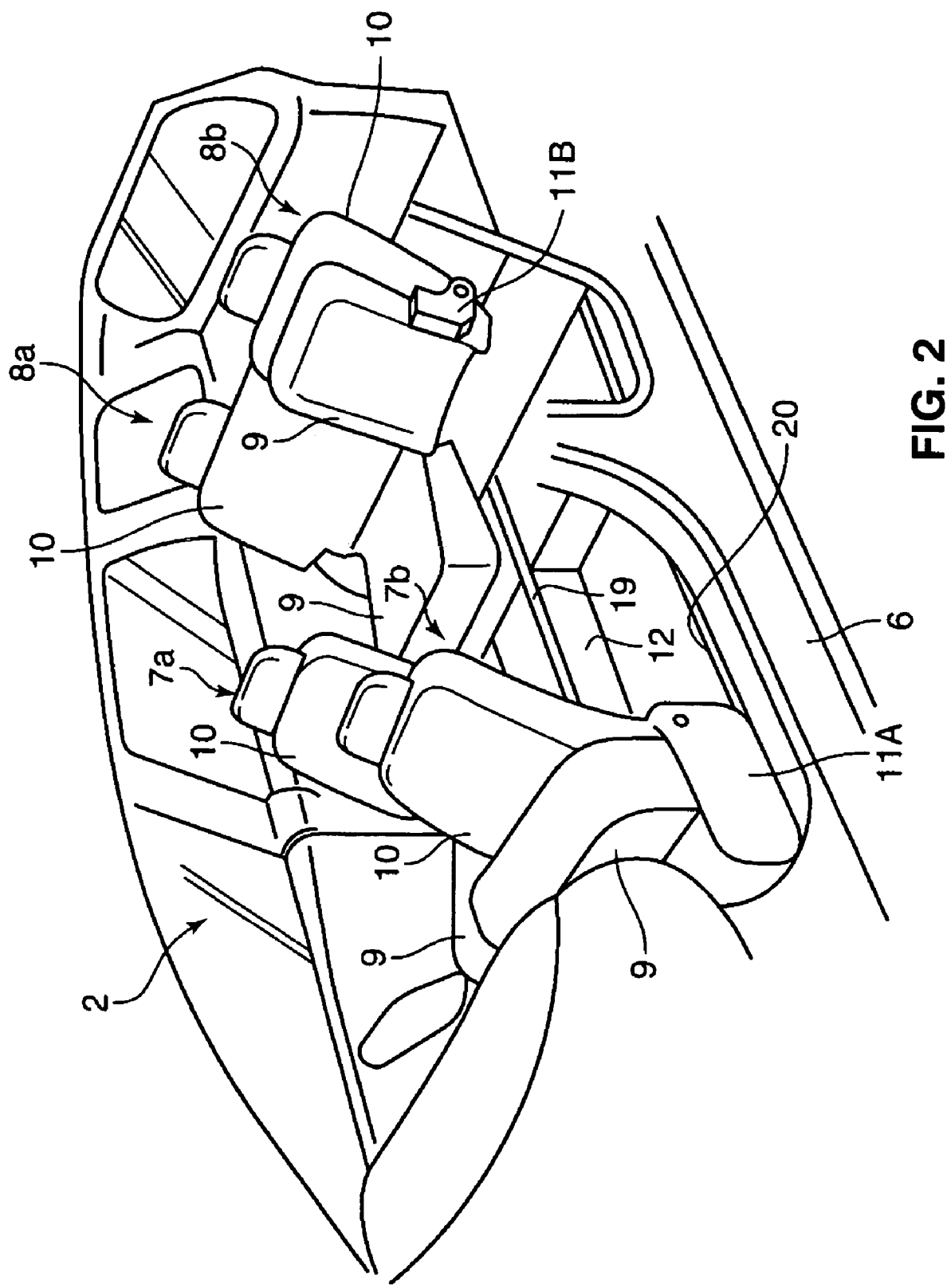
FIG. 2 is a perspective view illustrating the seat device for a vehicle according to the present embodiment.

Each of the passenger seats 7 and 8 comprises a seat cushion 9 and a seat back 10. At least the assistant seat 7b and the rear seat (hereinafter, refereed to as "assistant-seat-side rear seat") 8b, which is located just behind the assistant seat 7b, include support members 11A and 11B which pivotally support respective seat cushions 9, 9. Herein, as illustrated in FIG. 1, these seat cushions 9, 9 of the assistant seat 7b and the assistant-seat-side rear seat 8b are configured so as to be located in their use positions, where they are disposed substantially horizontally as illustrated in FIG. 1, and in their stored positions, where they are rotated upward and folded with a short longitudinal thickness as illustrated in FIG. 2.

Figure 3:
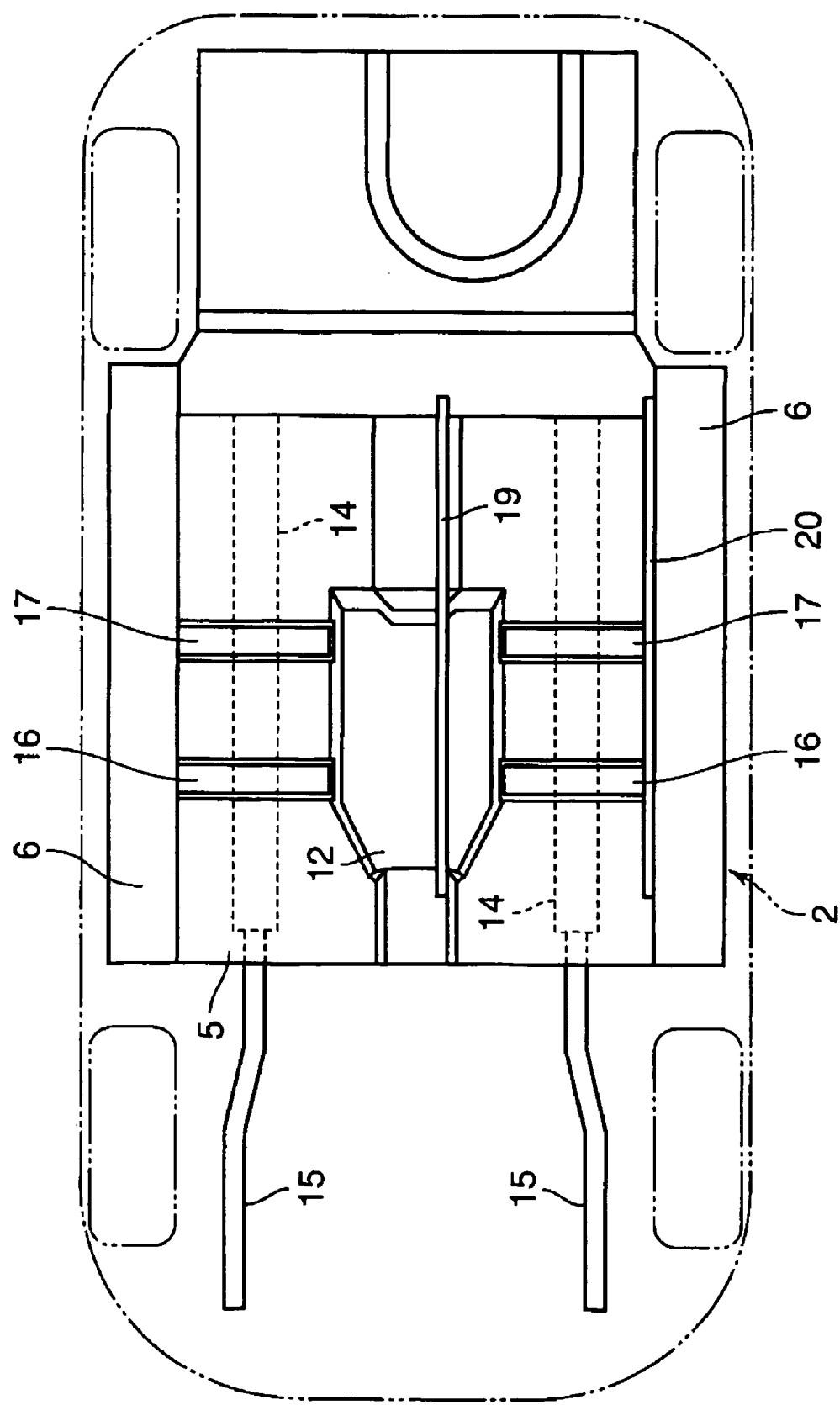
FIG. 3 is a plan view illustrating a specific structure of a floor panel.
Figure 4:
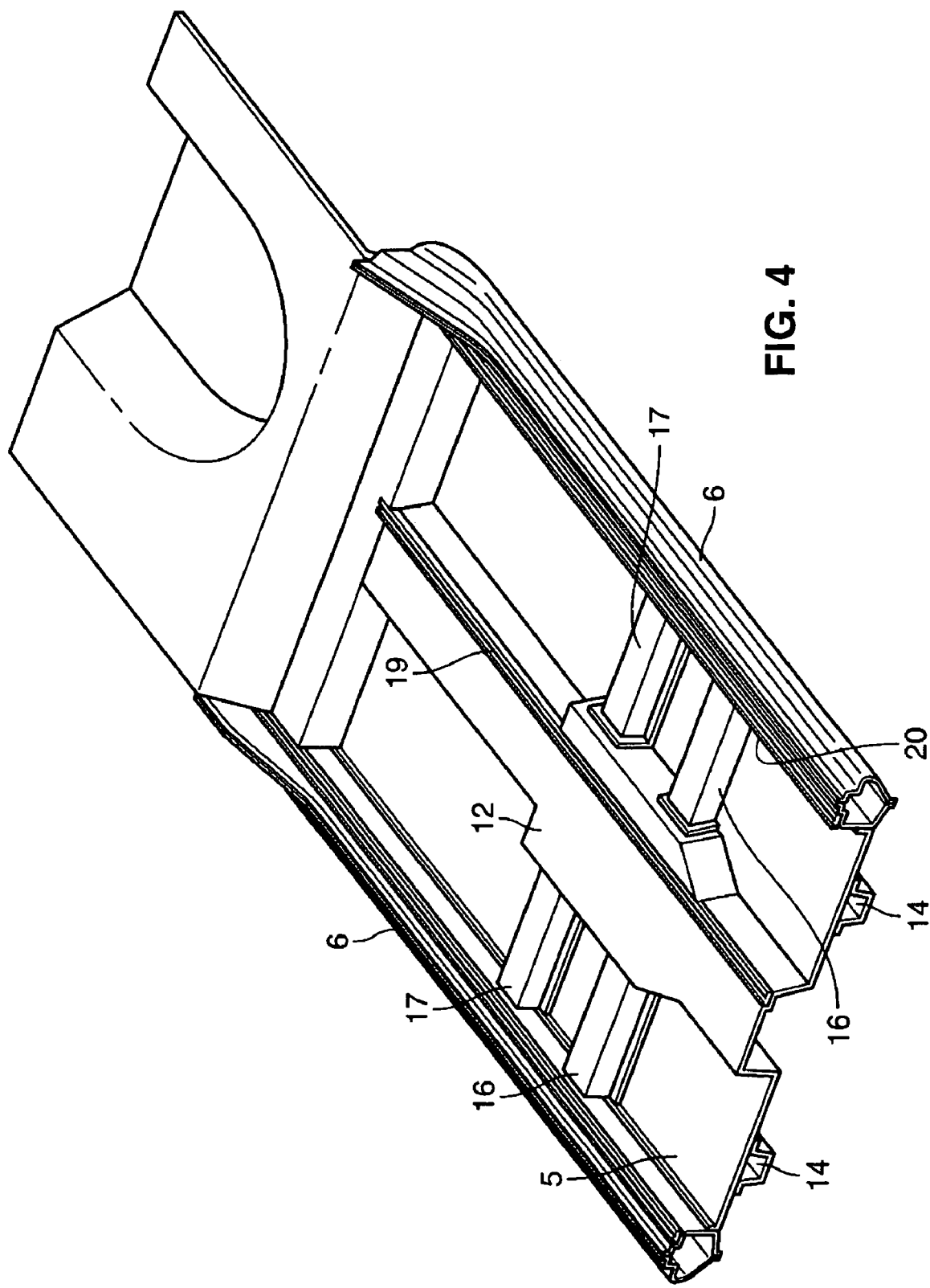
FIG. 4 is a perspective view illustrating the specific structure of the floor panel.
Figure 5:
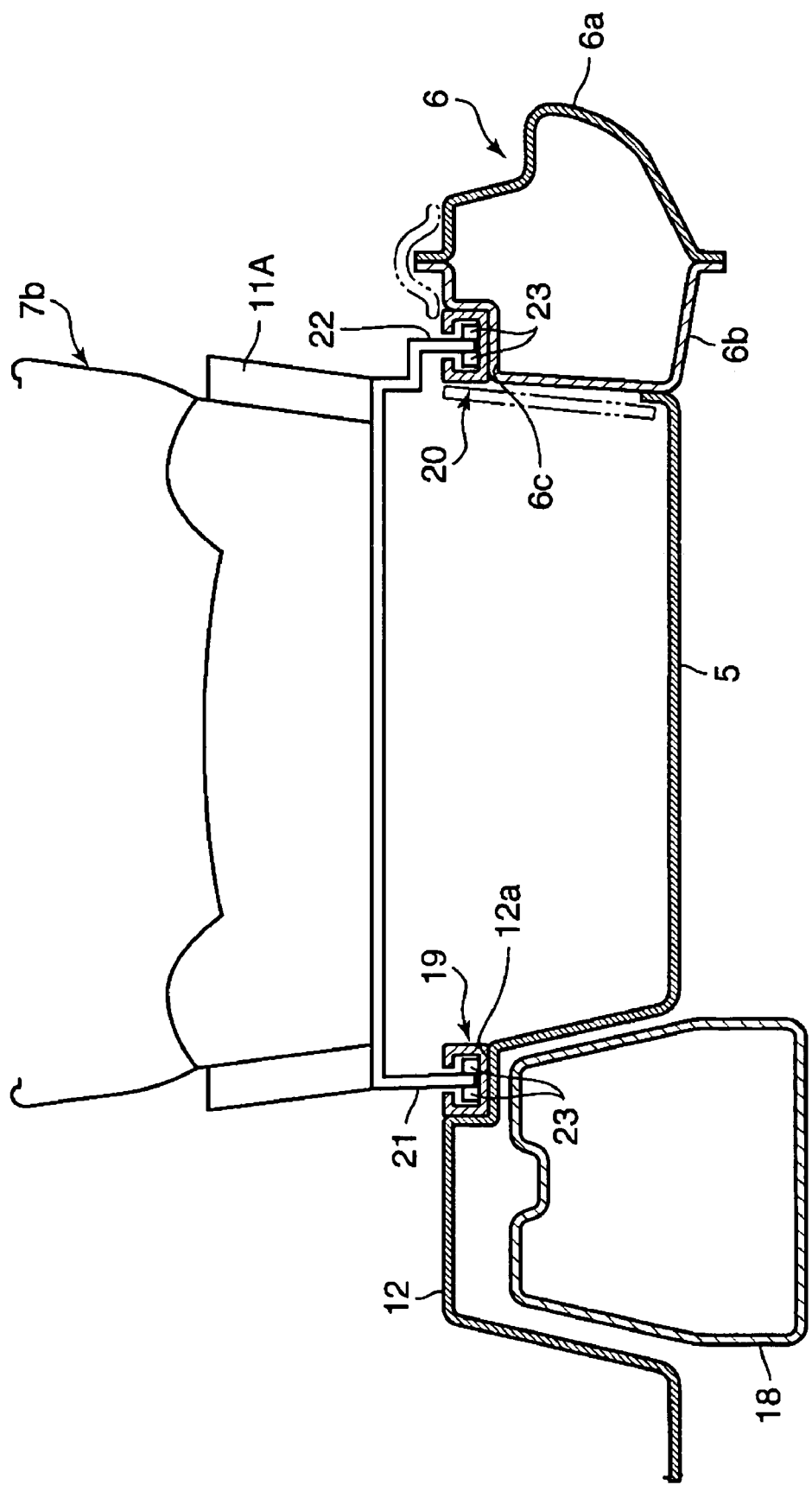
FIG. 5 is a sectional elevation view illustrating a disposition state of a seat rail member.
Figure 6:
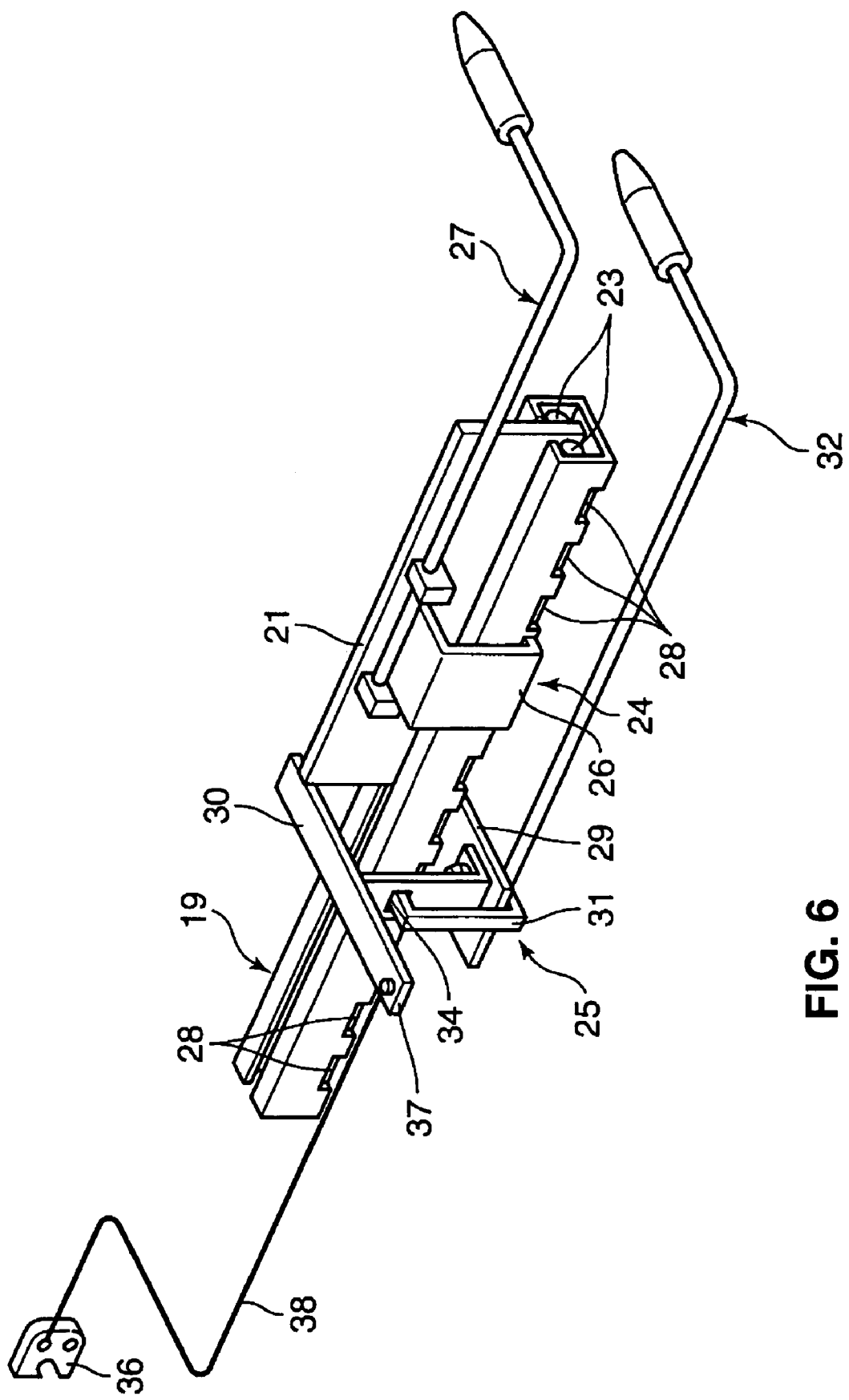
FIG. 6 is a perspective view illustrating a specific structure of an engagement mechanism and a stopper mechanism for an assistant seat.
Figure 7:
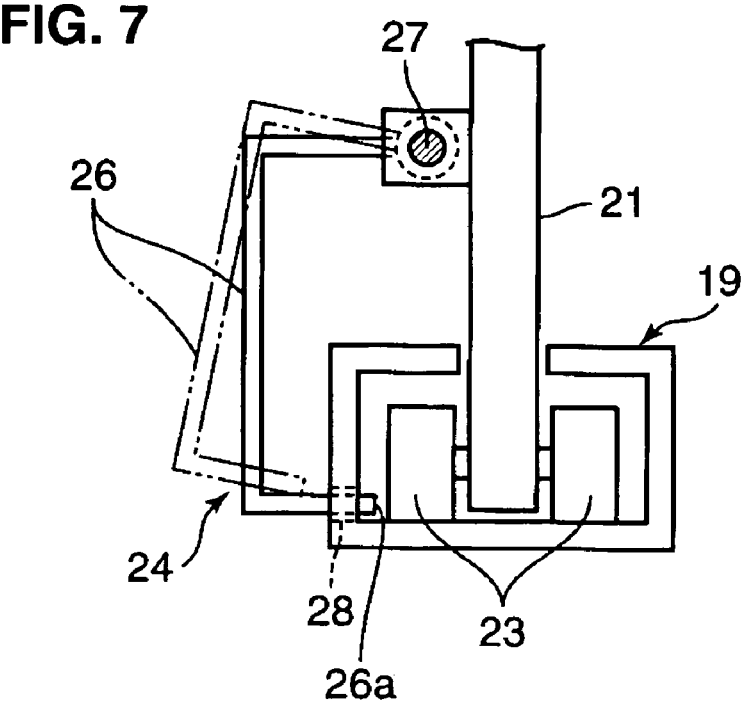
FIG. 7 is an elevation view illustrating the specific structure of the engagement mechanism.
Figure 8:
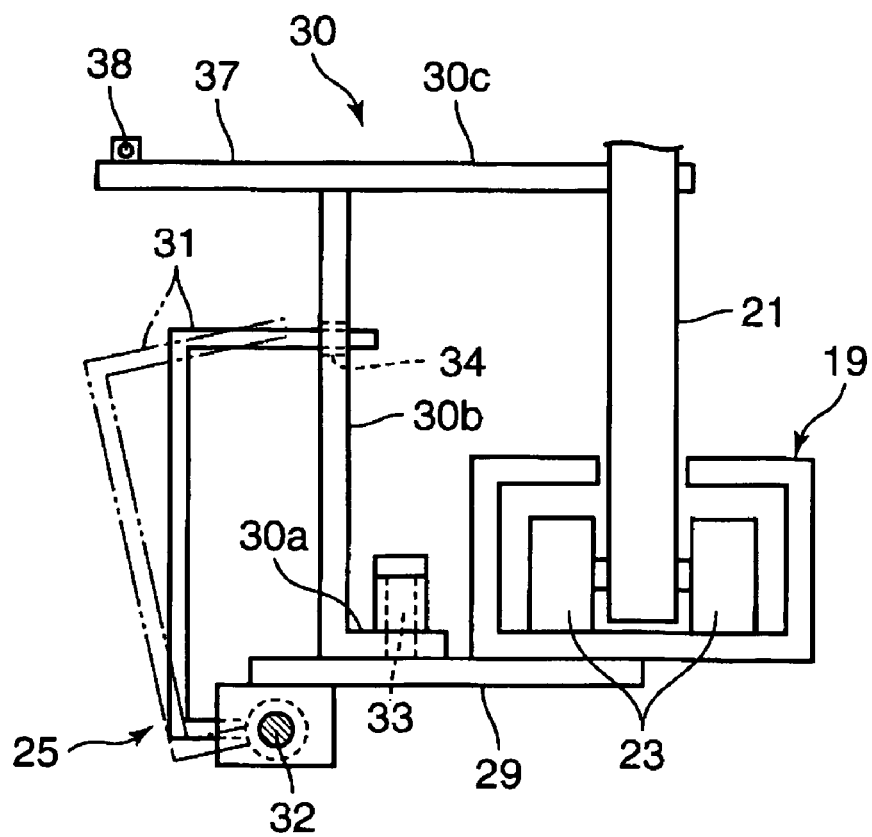
FIG. 8 is an elevation view illustrating the specific structure of the stopper mechanism.

At the central portion of the floor panel 5, as illustrated in FIGS. 3 and 4, is provided a tunnel portion 12, which projects upward so as to extend in the longitudinal direction of the vehicle and whose both ends are fixed to inside faces of the above-described side sills 6, 6. Also, to a lower face of the floor panel 5 is attached a pair of floor frames 14, 14 extending in the longitudinal direction at right and left sides, whose front ends are connected integrally with front side frames 15, 15 respectively which are disposed in an engine room located at the front of vehicle.

A pair of front and rear floor cross members 16, 16 and 17, 17 is fixed to the upper face of the floor panel 5 so as to interconnect the tunnel portion 12 and the side sills 6, 6. Also, a fuel tank 18 is disposed below the tunnel portion 12, extending in the longitudinal direction (see FIG. 5). The upper face of the tunnel portion 12 includes a recess portion 12*a* at one side edge thereof (the one edge at a side of assistant seat 7*b*), in which a seat rail member 19 to support an inside edge portion of the assistant seat 7*b* is disposed.

Each of the side sills 6, 6 forms a closed cross section extending in the longitudinal direction with an outer panel 6*a* and an inner panel 6*b*, which are connected with each other via upper and lower flanges. Also, the upper face of the inner panel 6*b* includes a recess portion 6*c* at an inside edge thereof, in which a seat rail member 20 to support an outside edge portion of the assistant seat 7*b* is disposed.

The above-described seat rail members 19 and 20 are formed of a steel plate or the like, which include an upward-opening groove, respectively. Respective lower ends of the slide plates 21 and 22 are inserted in the grooves of the rail members 19 and 20. And, a pair of slide rollers 23, 23, which is rotatably supported on horizontal axes provided at lower ends of the slide plates 21 and 22, is located in the grooves so as to move along and on the bottoms of the seat rail members 19 and 20. Thus, the slide plates 21 and 22 and the assistant seat 7*b* are provided so as to slide in the longitudinal direction of the vehicle.

The slide plate 21 which is located at the inside of the vehicle has an engagement mechanism 24 to fix the assistant seat 7*b* to any specified longitudinal positions as illustrated in FIGS. 6 through 10. Also, the seat rail member 19 supporting the slide plate 21 at the inside of the vehicle has a stopper mechanism 25 to limit a longitudinal movement of the assistant seat 7*b* at any specified positions.

The above-described engagement mechanism 24 comprises a lock plate 26 which is rotatably supported at the slide plate 21, and an operation lever 27 which operates the lock plate 26. At the lower end of the lock plate 26 is provided an engagement projection 26*a* which projects toward the seat rail member 19, and at the side face of the seat rail member 19 are provided some slots 28 with specified intervals. The longitudinal movement of the slide plate 21 and the assistant seat 7*b* are limited by engaging the engagement projection 26*a* at the lock plate 26 with the slots 28 at the seat rail member 19. Meanwhile, the longitudinal movement of the slide plate 21 and the assistant seat 7*b* are permitted by releasing the engagement of the engagement projection 26*a* with the slots 28 with the operation of the lock plate 26 toward an unlock direction by the operation lever 27.

The above-described stopper mechanism 25 comprises a base plate 29 which is fixed to a lower face of the seat rail member 19, a stopper member 30 which is supported at an upper face of the base plate 29, a lock plate 31 whose base end portion is supported at a lower face of the base plate 29, and an operation lever 32 which operates the lock plate 31. The stopper member 30 includes a support portion 30*a* which is rotatably supported around a vertical axis 33 projecting from the base plate 29, a stand portion 30*b* which projects from a side end of the support portion 30*a*, and a horizontal portion 30*c* which is attached to an upper end of the projecting portion 30*b*.

Figure 9:
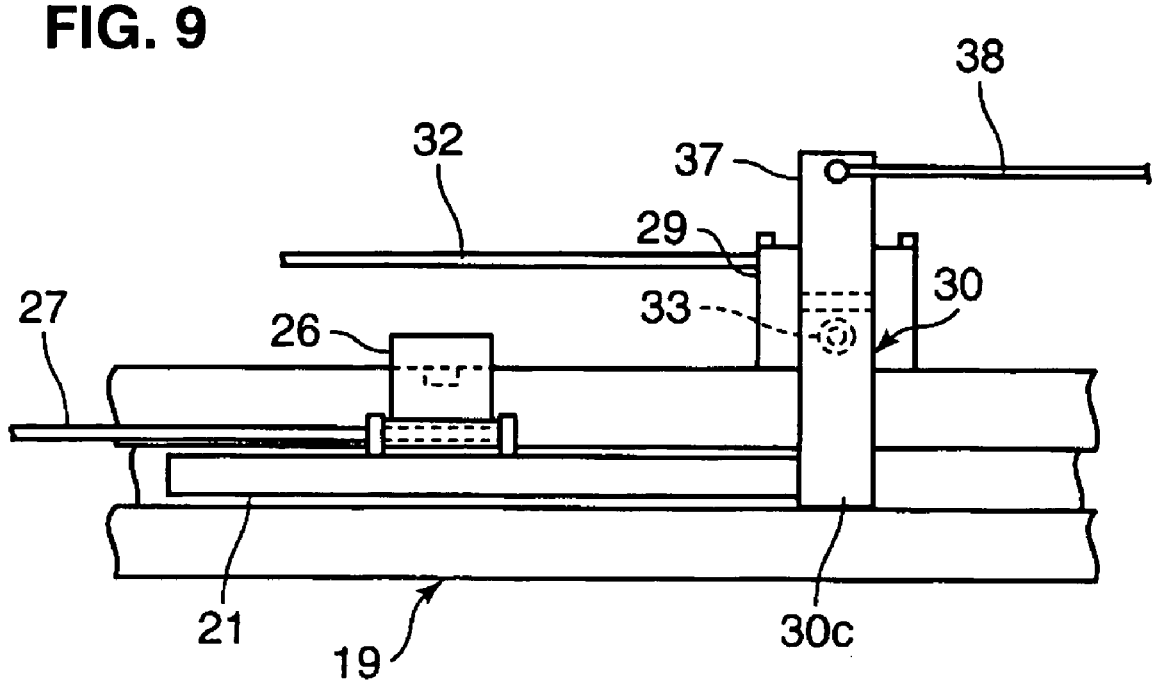
FIG. 9 is a plan view illustrating an engagement state of a slide plate.

Herein, the rotation of the stopper member 30 is normally limited by the insertion of the upper end of the lock plate 31 into an engagement hole 34 formed at the stand portion 30*c* of the stopper member 30. In this state, when the assistant seat 7*b* is moved backward and a rear end of the slide plate 21 contacts the horizontal portion 30*c* of the stopper member 30 as illustrated in FIG. 9, the rearward movement of the slide plate 21 is limited by the stopper member 30 of the stopper mechanism 25. The position of the assistant seat 7*b* which is limited by the stopper mechanism 25 is set at the location slightly before the seat cushion 9 of the assistant-seat-side rear seat 8*b* in the normal state, so that the assistant seat 7*b* can be prevented from contacting knees or the like of the passenger sitting on the assistant-seat-side rear seat 8*b*.

Figure 10:
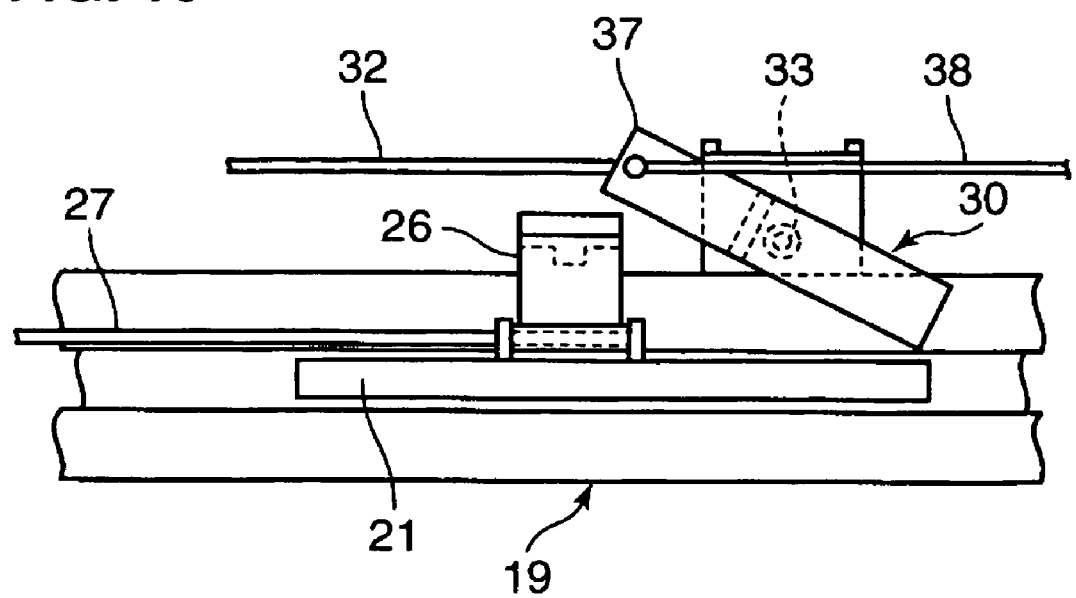
FIG. 10 is a plan view illustrating an engagement-release state of the slide plate.

At the point the assistant seat 7*b* comes to the above-described limit position, the lock plate 31 is operated in the unlock direction to release the engagement of the upper end of the lock plate 31 with the engagement hole 34. Thus, the rotation of the stopper member 30 is permitted. As a result, when the limit of the rearward movement of the slide plate 21 by the stopper member 30 is released and then the assistant seat 7*b* is pushed backward, the stopper member 30 rotates around the vertical axis 33 as illustrated in FIG. 10 and then the rearward movement of the slide plate 21 and the assistant seat 7*b* are permitted.

At the assistant-seat-side rear seat 8*b* behind the assistant seat 7*b* is provided a lock arm 36 to lock the seat cushion 9 in its horizontal use position. Also, at the horizontal portion 30*c* of the stopper member 30 is provided integrally a drive lever 37 to unlock the seat cushion 9 locked by the lock arm 36, and this lock lever 37 and the lock arm 36 are integrally connected via a wire 38. The lock arm 36 is operated toward the unlock direction when the rotation of the drive lever 37 is transferred to the lock arm 36 via the wire 38.

Figure 11:
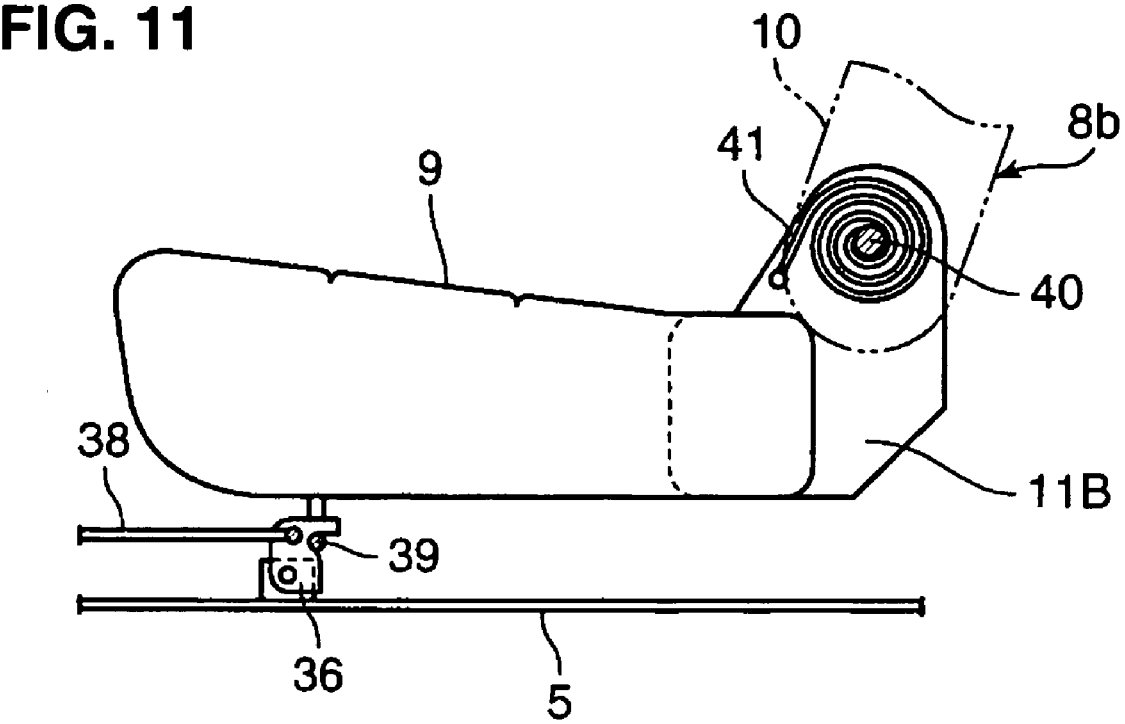
FIG. 11 is a side view illustrating an engagement state of a seat cushion of an assistant-seat-side rear seat.
Figure 12:
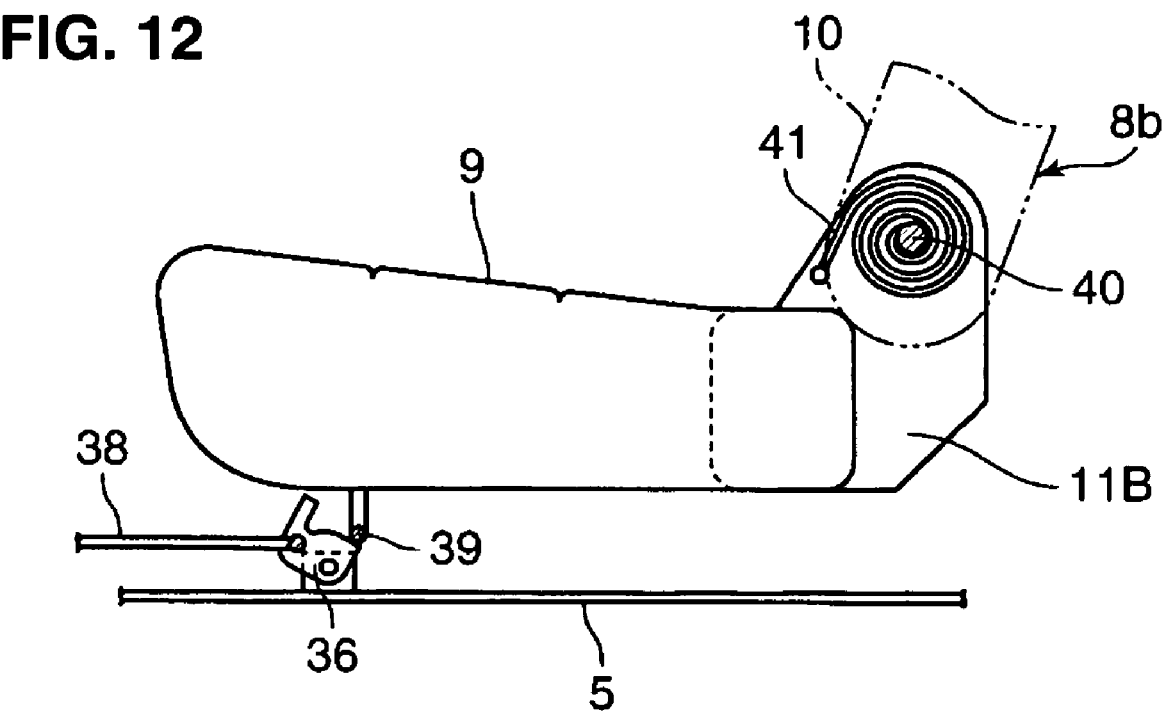
FIG. 12 is a side view illustrating an engagement-release state of the seat cushion of the assistant-seat-side rear seat.
Figure 13:
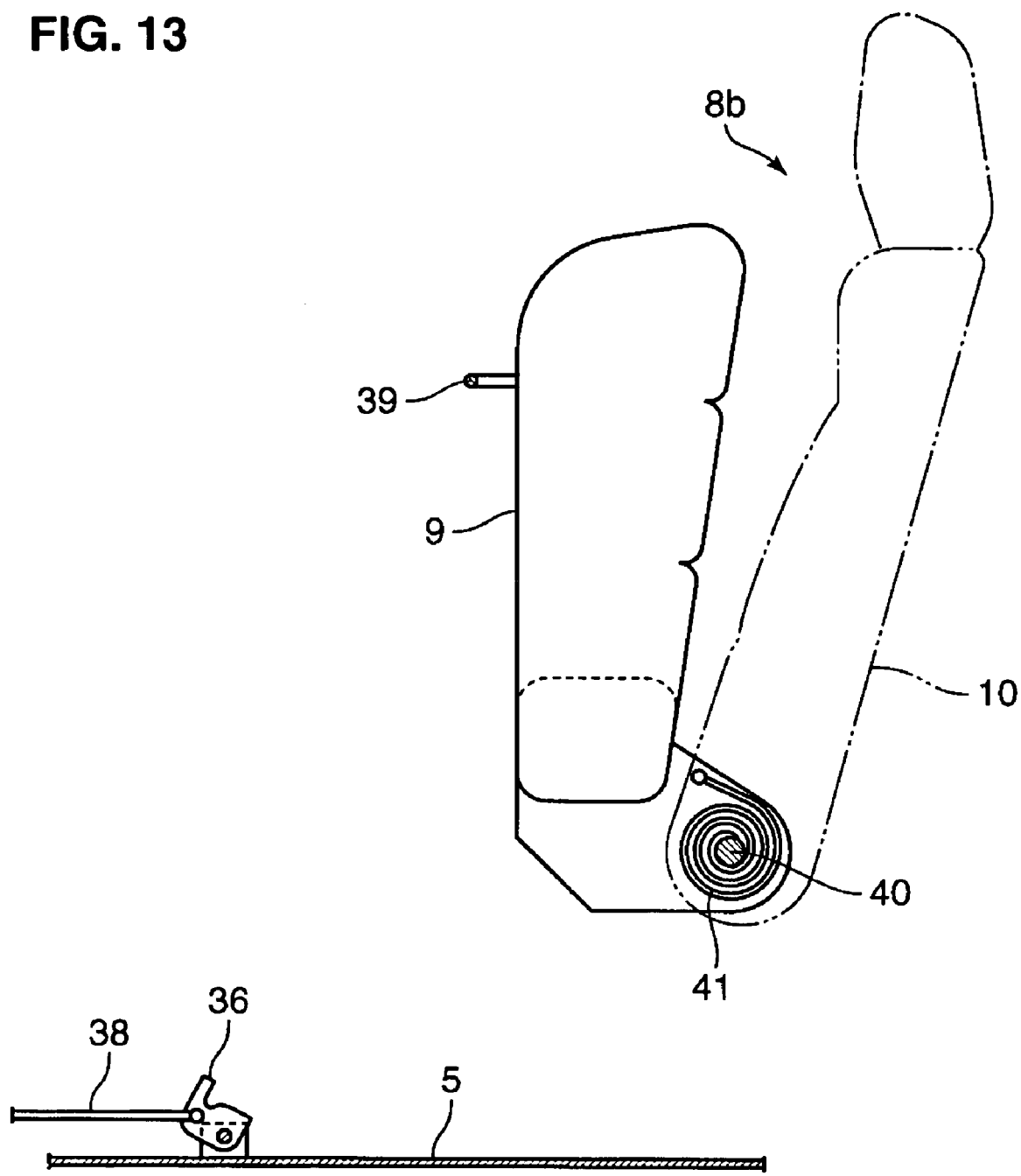
FIG. 13 is a side view illustrating a state in which the seat cushion of the assistant-seat-side rear seat is rotated upward.

Namely, the lock arm 36 is rotatably supported on the floor panel 5 located below the seat cushion 9 of the assistant-seat-side rear seat 8*b* as illustrated in FIGS. 11 through 13, while a striker 39 to be engaged by the lock arm 36 is provided at the lower face of the seat cushion 9. Also, the seat cushion 9 of the assistant-seat-side rear seat 8*b* is rotatably supported around a support axis 40 provided at the support member 11B, and resiliently biased upward by a biasing means 41 which comprises a torsional spring or the like which is engaged between the support axis 40 and the support member 11B.

And, in the normal state, the lock arm 36 engages the striker 39 by a biasing means comprising a torsional spring or the like which is not illustrated. Thus, as illustrated in FIG. 11, the seat cushion 9 of the assistant-seat-side rear seat 8*b* is locked in the substantially horizontal use position against the biasing force of the biasing means 41.

Figure 14A:
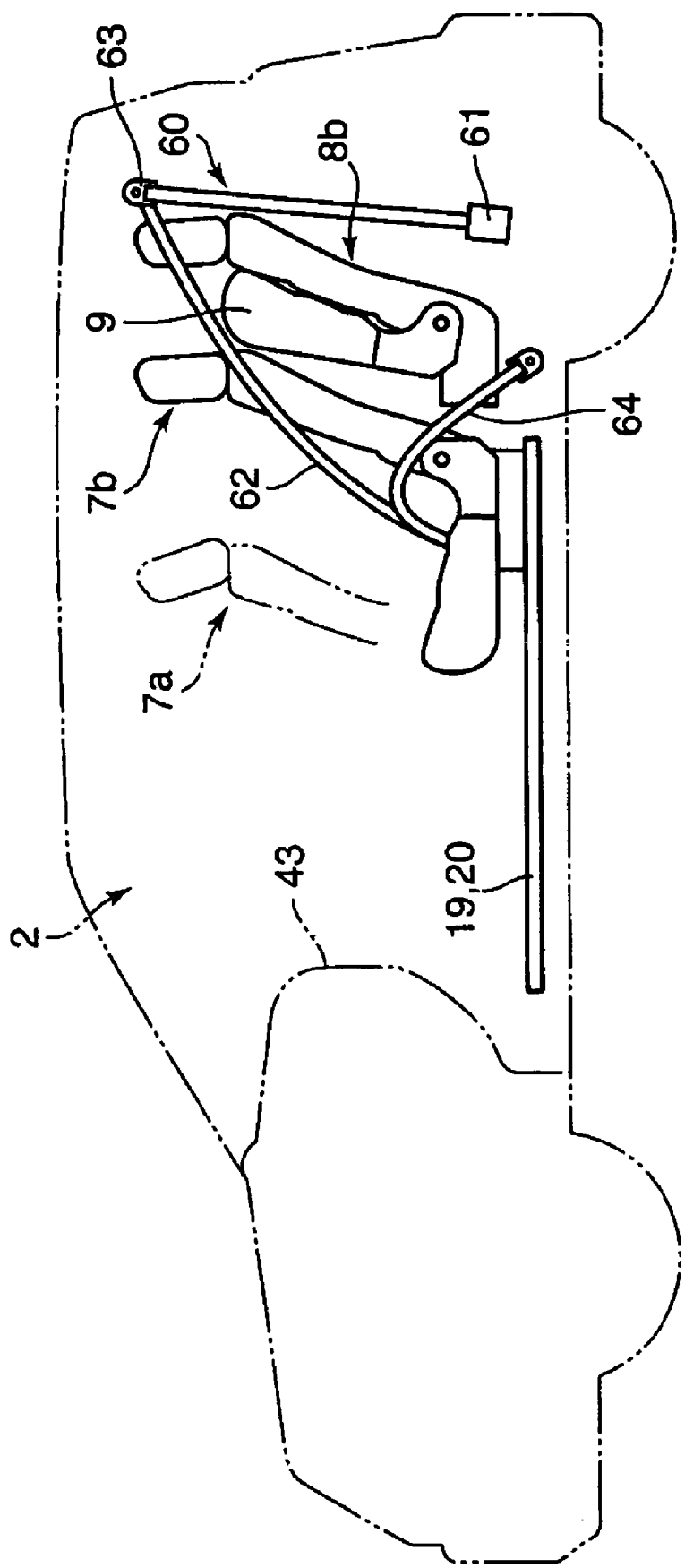
FIG. 14A is a side view illustrating a state in which the assistant seat is moved rearward.

When the stopper member 30 and the drive lever 37 are rotated around the vertical axis 33 by pushing the assistant seat 7*b* backward as illustrated in FIG. 10, the lock arm 36 is driven toward the releasing direction of the engagement with the striker 39 via the above-described wire 38. Thus, the engagement of the lock arm 36 with the seat cushion 9 is released as illustrated in FIG. 12. As a result, the seat cushion 9 is rotated upward around the support axis 40 by the biasing force of the biasing means 41 as illustrated in FIGS. 13 and 14A, and the seat cushion 9 and the seat back 10 are both located in the upright positions, i.e., in the stored positions where the assistant-seat-side rear seat 8*b* has a short longitudinal thickness.

Herein, the rear ends of the above-described seat rail members 19 and 20 extend rearward so as to allow the assistant seat 7*b* to be moved backward to the normal use position of the seat cushion 9 in the above-described stored position of the seat cushion 9 and the seat back 10.

Figure 14B:
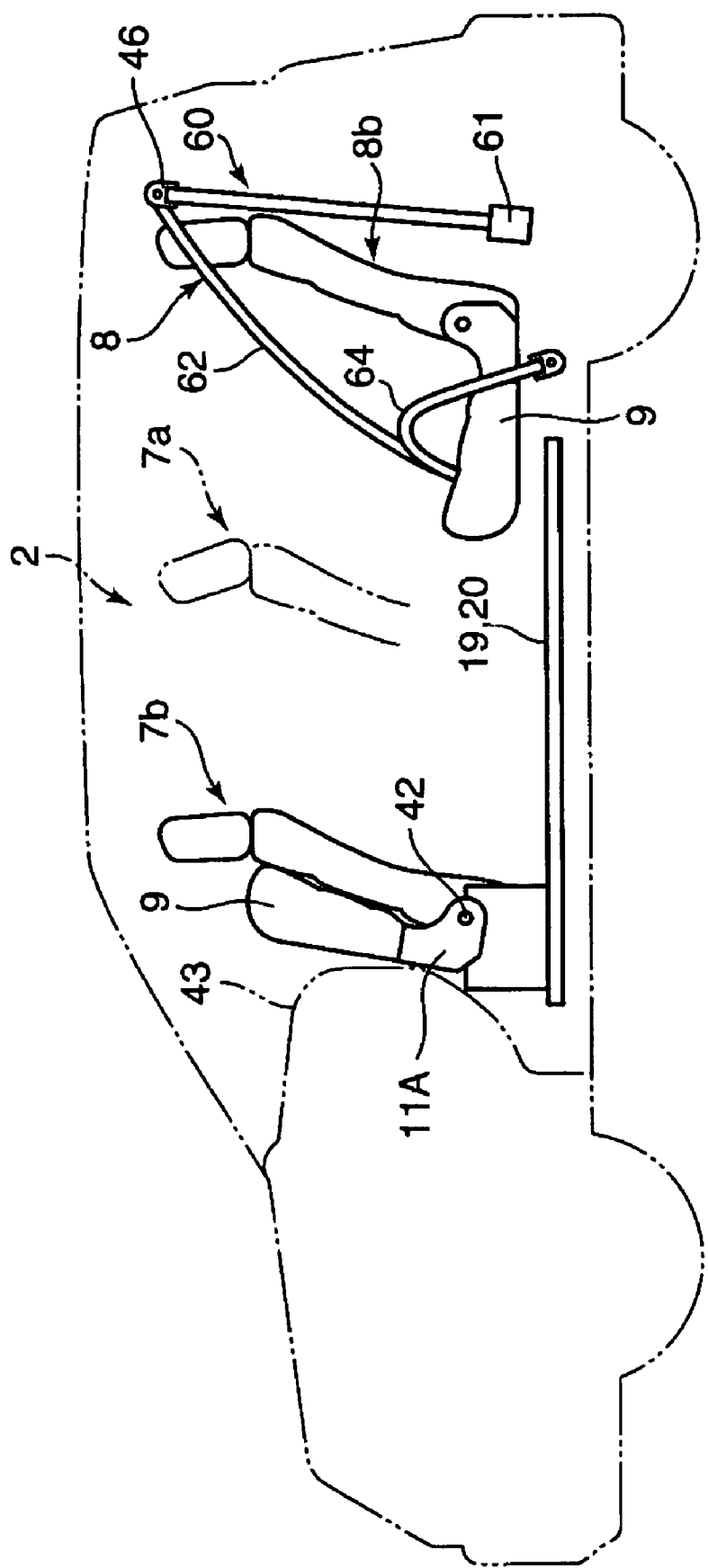
FIG. 14B is a side view illustrating a state in which the assistant seat is moved forward.

Also, the seat cushion 9 of the assistant seat 7*b* can be rotated upward around a support axis 42 provided at the support member 11A, and the assistant seat 7b can be moved forward to its stored position, keeping this state where both the seat cushion 9 and the seat back 10 are located in their upright positions, as illustrated in FIG. 14B. Herein, the front ends of the seat rail members 19 and 20 extend forward below an instrument panel 43 so as to allow the assistant seat 7b to be positioned close to the instrument panel 43 in its stored position.

Further, as illustrated in FIGS. 14A, 14B, 15A and 15B, at the rear side of the cabin 2 is provided a three-point-type of seat belt mechanism 60 to protect the passenger on the rear-row seat 8b. This seat belt mechanism 60 comprises a retractor 61 which is provided at a lower portion behind the rear-row seat 8, an anchor 63 which supports a shoulder belt 62 at the upper side of the vehicle, a waist belt 64 which restrains a waist portion of the passenger, and a buckle 65 which fixes a tongue (not illustrated) coupled to front ends of the shoulder and waist belts 62 and 64 to the vehicle body at the inside of the seat cushion 9 of the rear-row seat 8b. As illustrated in 14A, the seat belt mechanism 60 is configured so as to be applicable to the passenger sitting on the assistant seat 7b which has been moved back along the seat rail members 19 and 20 to a rearmost position which corresponds to the normal use position of the assistant-seat-side rear seat 8b, with the seat cushion 9 of the assistant-seat-side rear seat 8b being rotated upward to its stored position.

Figure 15A:
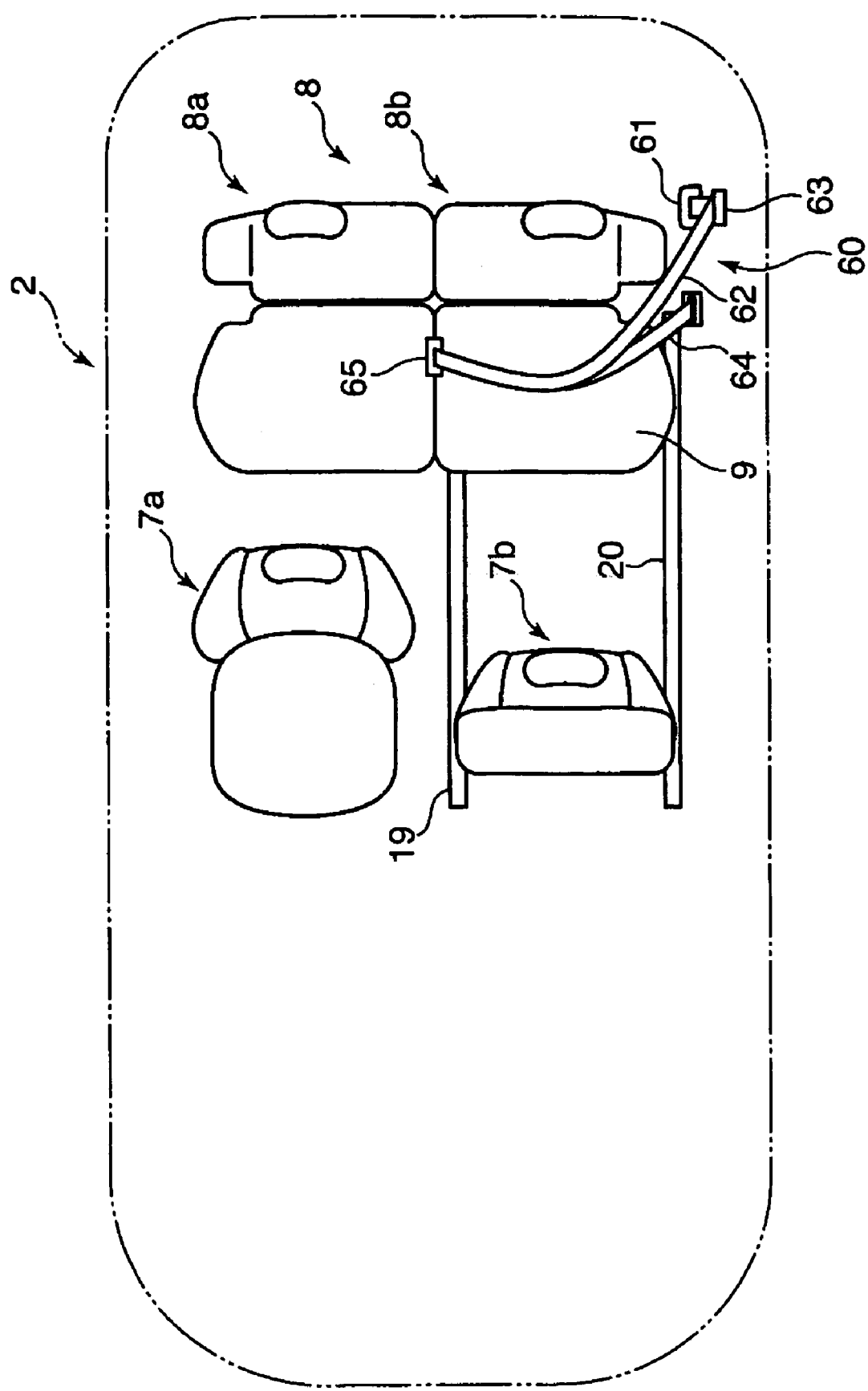
FIG. 15A is a plan view illustrating the state in which the assistant seat is moved forward.
Figure 15B:
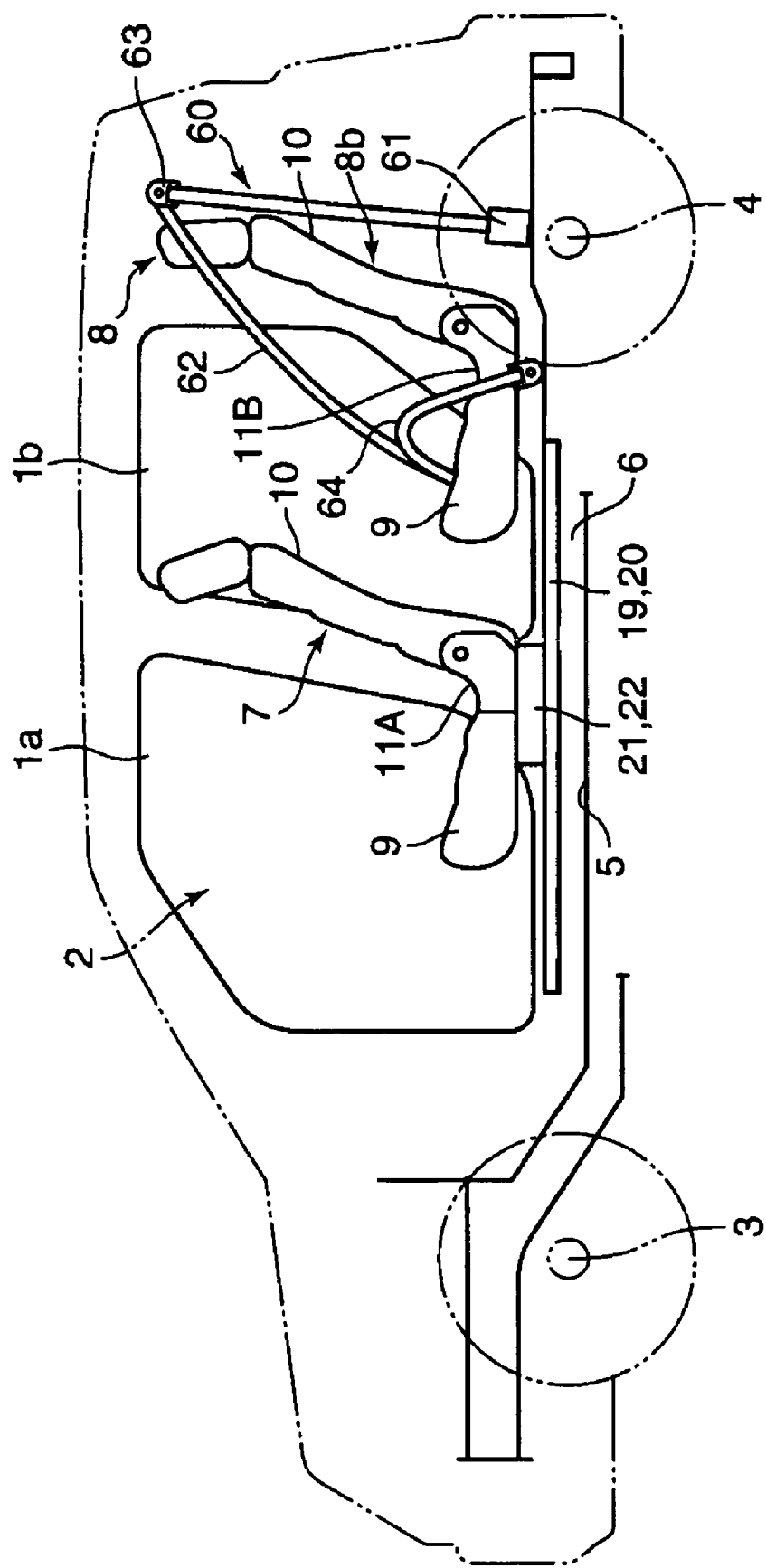
FIG. 15B is a side view illustrating the seat device for a vehicle with a seat belt mechanism of the present embodiment.

Also, as illustrated in FIG. 15B, when the assistant seat 7b is located beside the driver seat 7a in its normal use position, the passenger sitting on the assistant-seat-side rear seat 8b can be protected by this seat belt mechanism 60. In this sate, respective passengers sitting on the driver seat 7a and the assistant seat 7b are protected respectively by a driver-seat seat belt mechanism and an assistant-seat seat belt mechanism, which are not illustrated.

Then, when the assistant seat 7b is moved toward the rear of the vehicle from the normal use position (beside the driver seat 7a) by releasing the engagement of the assistant seat 7b by the engagement mechanism 24, the rearward movement of the assistant seat 7b is limited by the stopper mechanism 25 at the point which is slightly before the seat cushion 9 of the rear-row seat 8b located in the normal use position.

In order to allow the assistant seat 7b to be moved rearward further from this point, the rearward-movement limiting state by the stopper mechanism 25 is released and then the stopper member 30 is rotated by sliding the assistant seat 7b backward, which drives the drive lever 37 to unlock the lock arm 36. As a result, the engagement of the seat cushion 9 of the assistant-seat-side rear seat 8b by the lock arm 36 is released, and then the seat cushion 9 is rotated upward by the biasing force of the biasing means 41 and moves to the stored position. Thus, the assistant seat 7b is allowed to be moved rearward further along the seat rail members 19 and 20, so that it can come to the position corresponding to the normal use position of the assistant-seat-side rear seat 8b as illustrated in FIG. 14A.

Figure 15C:
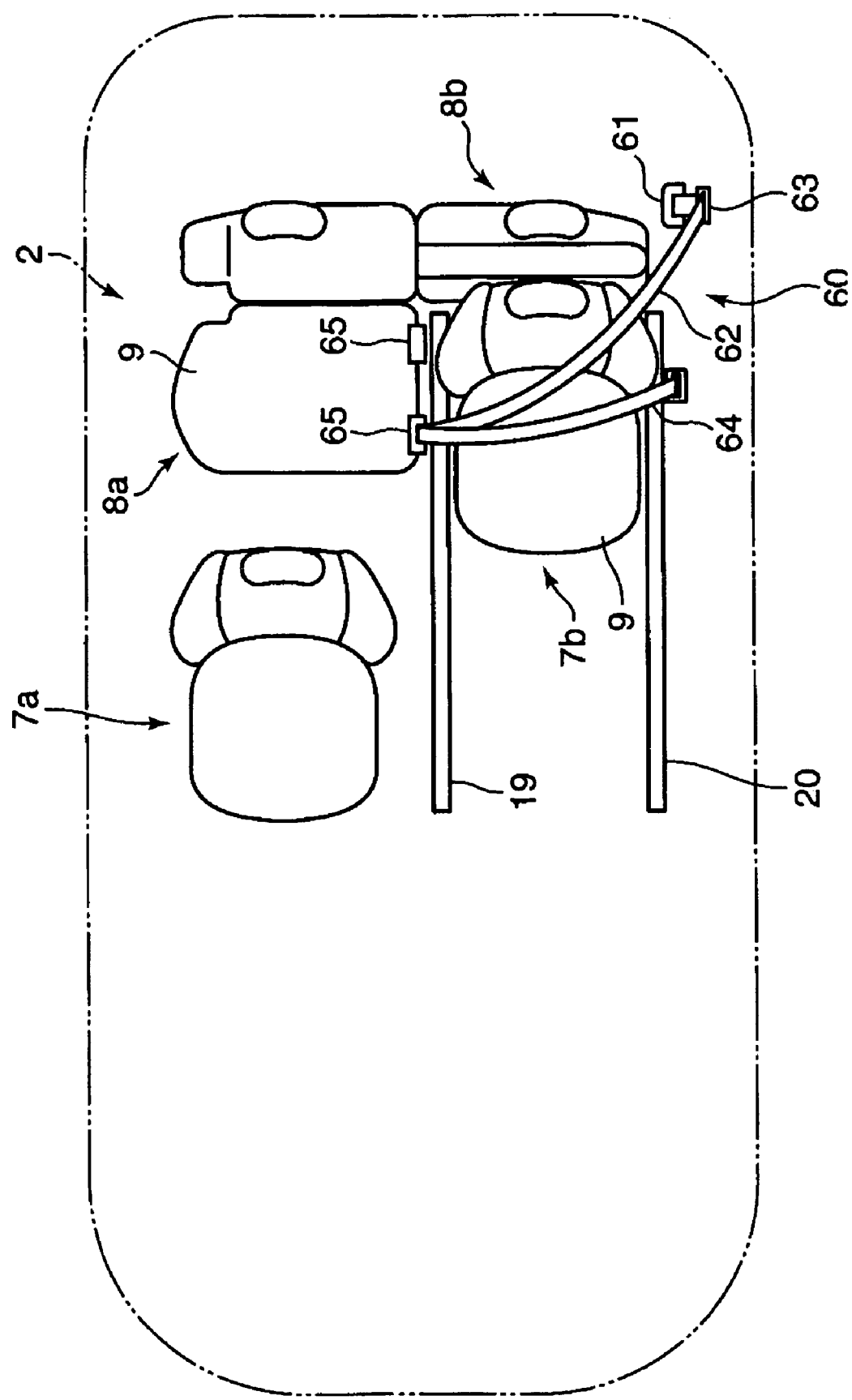
FIG. 15C is a plan view illustrating a use state of the seat belt mechanism.

Further, as illustrated in FIG. 15C, there may be provided a plurality of buckles 65, 65, which engage at the vehicle-body side the end of seat belt from the retractor 61 of the seat belt mechanism 60 which comprises the shoulder and waist belts 62 and 64 supported by the anchor 63. Accordingly, the front end of the seat belt may be selectively engaged with plural portions of the lower part of vehicle body. Thus, the passenger sitting on the assistant seat 7b in the rear position can be also properly protected by the seat belt mechanism 60 originally provided for the assistant-seat-side rear seat 8b. Also, the passenger sitting on the assistant seat 7b which is moved back near the assistant-seat-side rear seat 8b which does not have its stored position may be protected by this seat belt mechanism 60.

As described above, in the vehicle in which there are provided the front-row seat 7 comprising the driver and assistant seats 7a and 7b and the rear-row seat 8b in the cabin 2 which includes the ingress and egress openings 1a and 1b at its side face, the assistant-seat-side rear seat 8b provided behind the assistant seat 7b is configured so as to be located in the normal use position and in the stored position with its short longitudinal thickness, and the assistant seat 7b is provided so as to be moved rearward from the normal position beside the driver seat 7a to the position corresponding to the normal use position of the assistant-seat-side rear seat 8b. Accordingly, the movable range of the assistant seat 7b can be enlarged effectively with a simple structure and the space in the cabin can be utilized properly. And, the space which the passengers sitting on the deriver seat 7a and the assistant seat 7b use can be also enlarged extremely.

Namely, the seat cushion 9 of the assistant-seat-side rear seat 8b is rotated upward and the longitudinal thickness of the assistant-seat-side rear seat 8b is made short thereby at the area where the assistant seat 7b is located rearward. Thus, the rearward-movement range of the assistant seat 7b along the seat rail members 19 and 20 can be enlarged without having any complicated operations such as a removal of the assistant-seat-side rear seat 8b, so that the assistant seat 7b can be moved back to the position corresponding to the normal use state of the assistant-seat-side rear seat 8b. Accordingly, when the assistant-seat-side rear seat 8b is not used, there can be provided the large and useful space beside the driver seat 7a and before the assistant seat 7b.

Also, since the assistant-seat-side rear seat 8b is configured so as to make its longitudinal thickness short by rotating the seat cushion 9 upward at the area where the assistant seat 7b is located rearward, the longitudinal thickness of the assistant-seat-side rear seat 8b can be made short very easily by just rotating the cushion 9 around the support axis 40 provided at the support member 11B. Particularly, in the case where the biasing means 41 to rotate the seat cushion 9 upward around the support axis 40 is provided like the above-described embodiment, the seat cushion 9 can be automatically rotated upward and easily moved to the stored position of the assistant-seat-side rear seat 8b by just releasing the engagement of the seat cushion 9 by the lock arm 36.

Further, the seat belt mechanism 60 can be applicable to the passenger sitting on the assistant seat 7b by moving back the assistant seat 7b from the position beside the driver seat 7a to the position corresponding to the normal use position of the assistant-seat-side rear seat 8b. Accordingly, when the assistant-seat-side rear seat 8b is not used, there can be provided the large and useful space beside the driver seat 7a and before the assistant seat 7b by moving the assistant seat 7b rearward, and the passenger sitting on the assistant seat 7b can be protected by the seat belt mechanism 60 originally provided for the rear-row seat 8 without any complicated structure such as any movements of the seat belt mechanism provided for the assistant seat 7b as well.

Namely, in the above-described embodiment, the seat belt mechanism 60, which comprises the retractor 61 retracting the seat belt comprising the shoulder and waist belts 62 and 64, the anchor 63 supporting the shoulder belt 62 from the retractor 61 at the upper side of the vehicle, the buckle 65 fixing the front ends of the shoulder and waist belts 62 and 64 to the vehicle body, is disposed so as to protect both the passenger sitting on the assistant-seat-side rear seat 8b in the normal use position and the passenger sitting on the assistant seat 7b in the rearward-moved position. Accordingly, when the assistant seat 7b is located in the normal use position beside the driver seat 7a, the seat belt mechanism 64 can protect the passenger sitting on the assistant-seat-side rear seat 8b. Meanwhile, when the assistant seat 7b is moved rearward to the position corresponding to the normal use position of the assistant-seat-side rear seat 8b, the seat belt mechanism 64 can properly protect the passenger sitting on the assistant seat 7b with the shoulder belt 62 from the retractor 61 whose both ends are supported respectively by the anchor 63 and the buckle 65.

Particularly, in the above-described embodiment, the assistant-seat-side rear seat 8b is provided so as to be located in the stored position with the short longitudinal thickness by rotating the seat cushion 9 upward and the assistant seat 7b is provided so as to be moved rearward along the seat rail members 19 and 20 to the position corresponding to the normal use position of the assistant-seat-side rear seat 8b. Accordingly, the assistant seat 7b can be easily moved rearward to the seat belt mechanism 60 originally provided for the rear-row seat 8b without having any complicated operations such as the removal of the assistant-seat-side rear seat 8b. Also, the seat belt mechanism 60 can be used for both the assistant-seat-side rear seat 8b in the normal use position and the assistant seat 7b in the rearward-moved position. Thus, both the space utilization and the passenger protection can be attained with the simple structure.

Further, in the vehicle in which there are provided the front-row seat 7 comprising the driver and assistant seats 7a and 7b and the rear-row seat 8b in the cabin 2 as described above, there are provided the seat rail members 19 and 20 to support the assistant seat 7b so as to move it from the position beside the deriver seat 7a to the position near the assistant-seat-side rear seat 8b. Accordingly, the movable range of the assistant seat 7b can be enlarged effectively with the simple structure and the space in the cabin can be utilized properly. And, the space which the passengers sitting on the deriver seat 7a and the assistant seat 7b use can be also enlarged extremely.

Namely, when the assistant-seat-side rear seat 8b is not used, the assistant seat 7b can be moved rearward to the position close to the seat cushion 9 of the assistant-seat-side rear seat 8b along the seat rail members 19 and 20. Thus, the large space can be provided beside the driver seat 7a and before the assistant seat 7b, without having any complicated operations such as the removal of the assistant-seat-side rear seat 8b, and the apace can be utilized properly.

Particularly, in the above-described embodiment, the assistant-seat-side rear seat 8b is configured so as to be located in the stored position with the short longitudinal thickness by rotating the seat cushion 9 upward. And, the assistant seat 7b is configured so as to be movable to the position corresponding to the normal use state of the assistant-seat-side rear seat 8b. Thus, the rearward-movement range of the assistant seat 7b along the seat rail members 19 and 20 can be enlarged without having any complicated operations such as the removal of the assistant-seat-side rear seat 8b. Accordingly, when the assistant-seat-side rear seat 8b is not used, there can be provided the large and useful space beside the driver seat 7a and before the assistant seat 7b, and the utilization of the space can be effectively improved.

Also, in the case like the above-described embodiment, where the seat cushion 9 of the assistant-seat-side rear seat 8b is configured so as to be rotated upward around the support axis 40 provided at the support member 11B and the biasing means 41 to rotate the seat cushion 9 upward is provided, the seat cushion 9 can be automatically rotated upward and easily moved to the stored position of the assistant-seat-side rear seat 8b by just releasing the engagement of the seat cushion 9 by the lock arm 36.

In the above-described embodiment, since the seat rail member 20 supporting the outside edge portion of the assistant seat 7b is provided on the side sill 6 as a rigidity member which extends in the longitudinal direction along the side edge portion of the vehicle body, the sufficient supporting rigidity of the seat rail member 20 can be endured, and the side sill 6 can be reinforced effectively by, for example, welding the seat rail member 20 to the side sill 6.

Particularly, since the seat rail member 20 is located in the recess portion 6c formed along the inside edge of the upper face of the inner panel 6b of the side sill 6 in the embodiment, the disposition of the seat rail member 20 can be made stable effectively, and also the seat rail member 20 can be prevented from projecting from the side sill 6 so as to improve the passenger's getting on and off.

Also, in the case where the seat rail member 19 supporting the inside edge portion of the assistant seat 7b is provided on the tunnel portion 12 extending in the longitudinal direction at the central portion of the vehicle as a rigidity member like the above-described embodiment, the sufficient supporting rigidity of the seat rail member 19 can be ensured, and the tunnel portion 12 can be reinforced by the seat rail member 19 so as to improve its rigidity by welding the seat rail member 19 to the tunnel portion 12.

In the above-described embodiment, since the rearward movement of the assistant seat 7b is limited by the stopper mechanism 25 at the location slightly before the seat cushion 9 of the assistant-seat-side rear seat 8b in the normal state, the assistant seat 7b can be prevented from contacting knees or the like of the passenger sitting on the assistant-seat-side rear seat 8b when the assistant seat 7b is moved rearward.

And, after the above-described rearward-movement limitation is released by operating the operation lever 32 at the stopper mechanism 25, the stopper member 30 is rotated by sliding the assistant seat 7b rearward and at the same time the drive lever 37 is driven in the unlock direction of the lock arm 36. Accordingly, the seat cushion 9 of the assistant-seat-side rear seat 8b can be rotated upward to its stored position at the proper timing by the biasing force of the biasing means 41.

Herein, instead of the above-described structure in which the seat cushion 9 of the assistant-seat-side rear seat 8b can be rotated upward to its stored position by the biasing force of the biasing means 41, there may be provided a drive link to move the seat cushion 9 upward to the stored position by the rearward-movement operation of the assistant seat 7b or the seat cushion 9 may be configured so as to be rotated upward to the stored position by a manual operation of the passenger. Further, there may be provided an electric drive mechanism or a drive cylinder which rotates the cushion 9 upward automatically by output signals of a detecting means which detects the rearward-movement operation of the assistant seat 7b or a switching operation by the passenger.

Figure 16:
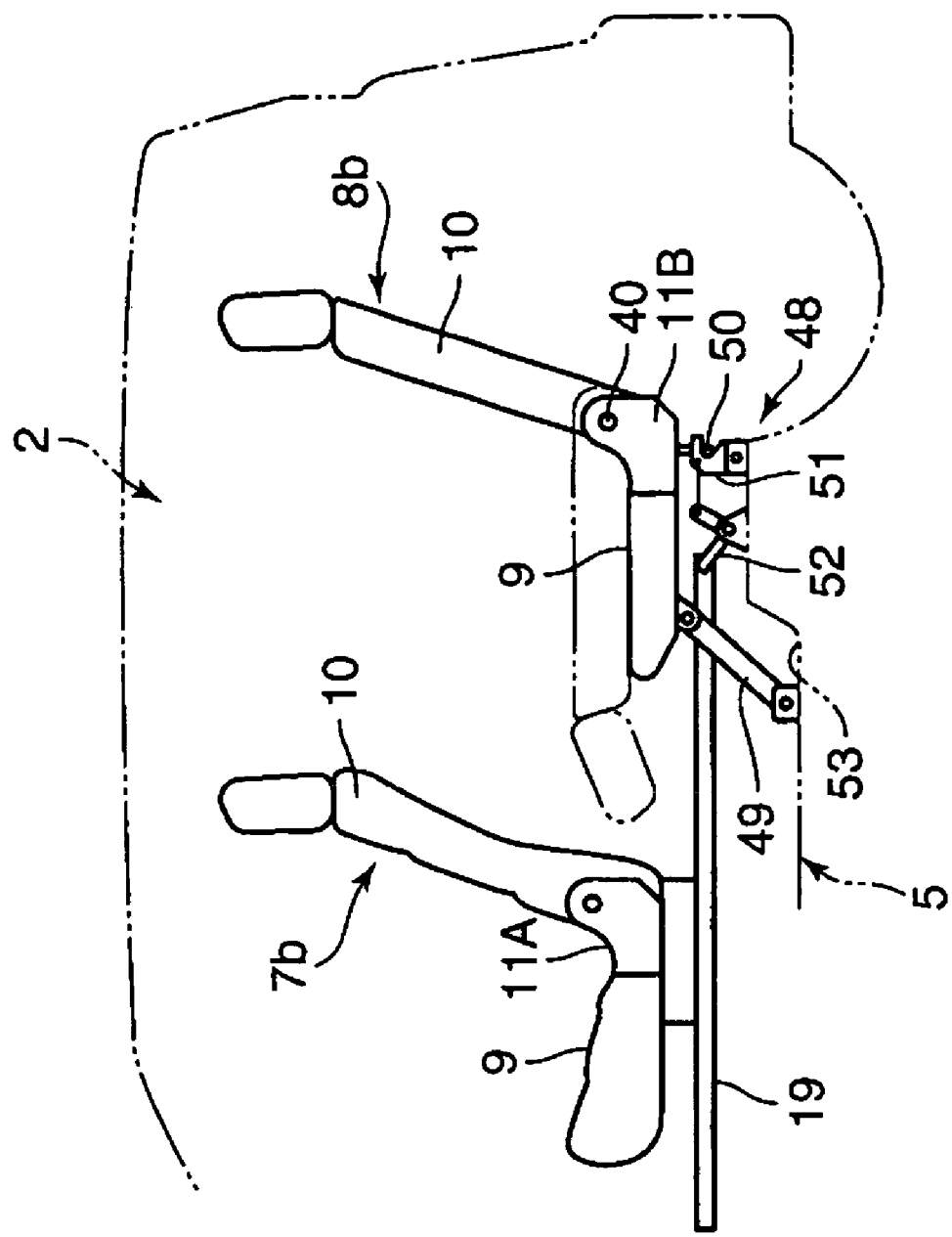
FIG. 16 is a side view illustrating another embodiment of the present invention.

Also, the seat back 10 of the assistant-seat-side rear seat 8b may be supported by the support axis 40 so as to be rotated forward and folded on the seat cushion 9 as illustrated by a broken line in FIG. 16, and there may be provided an engagement mechanism 48 to engage a rear end portion of the seat cushion 9 at the vehicle floor and a support link 49 to rotatably support the seat cushion 9. The engagement mechanism 48 comprises a lock arm 51 to be engaged by a striker 50 fixed to the lower face of the seat cushion 9 to lock the seat cushion 9 in the substantially horizontal position, and a drive lever 52 to release locking of the lock arm 51 with the striker 50.

Figure 17:
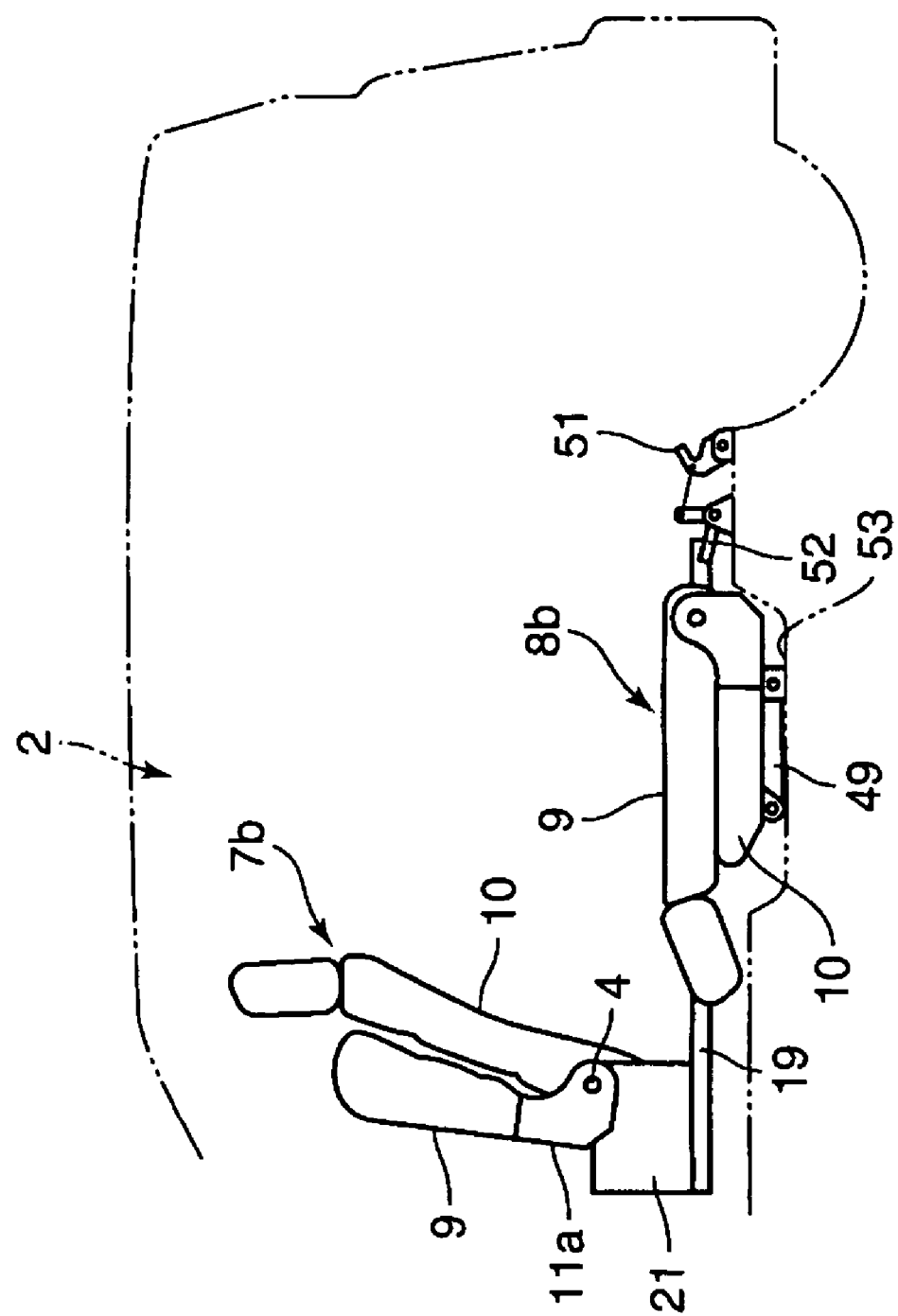
FIG. 17 is a side view illustrating a state in which the assistant-seat-side rear seat is stored.

Herein, when the engagement of the seat cushion 9 by the lock arm 51 is released by the operation of the drive lever 52 and the assistant-seat-side rear seat 8*b* with the seat back 10 folded on the seat cushion 9 is rotated forward by the support link 49, the assistant-seat-side rear seat 8*b* can be located and stored in a storing recess 53 formed at the floor panel 5 as illustrated in FIG. 17. In this case, since the assistant seat 7*b* is allowed to be moved rearward beyond this stored assistant-seat-side rear seat 8*b* in the recess 53 to the position where the assistant-seat-side rear seat 8*b* in the stored position is located, the rearward-movement range of the assistant seat 7*b* can be further enlarged.

Also, instead of the independent seats 8*a* and 8*b* of the rear-row seat 8 which can be stored separately like the above-described embodiment, there may be provided a single integrated rear seat 8 which can be stored integrally.

Figure 18:
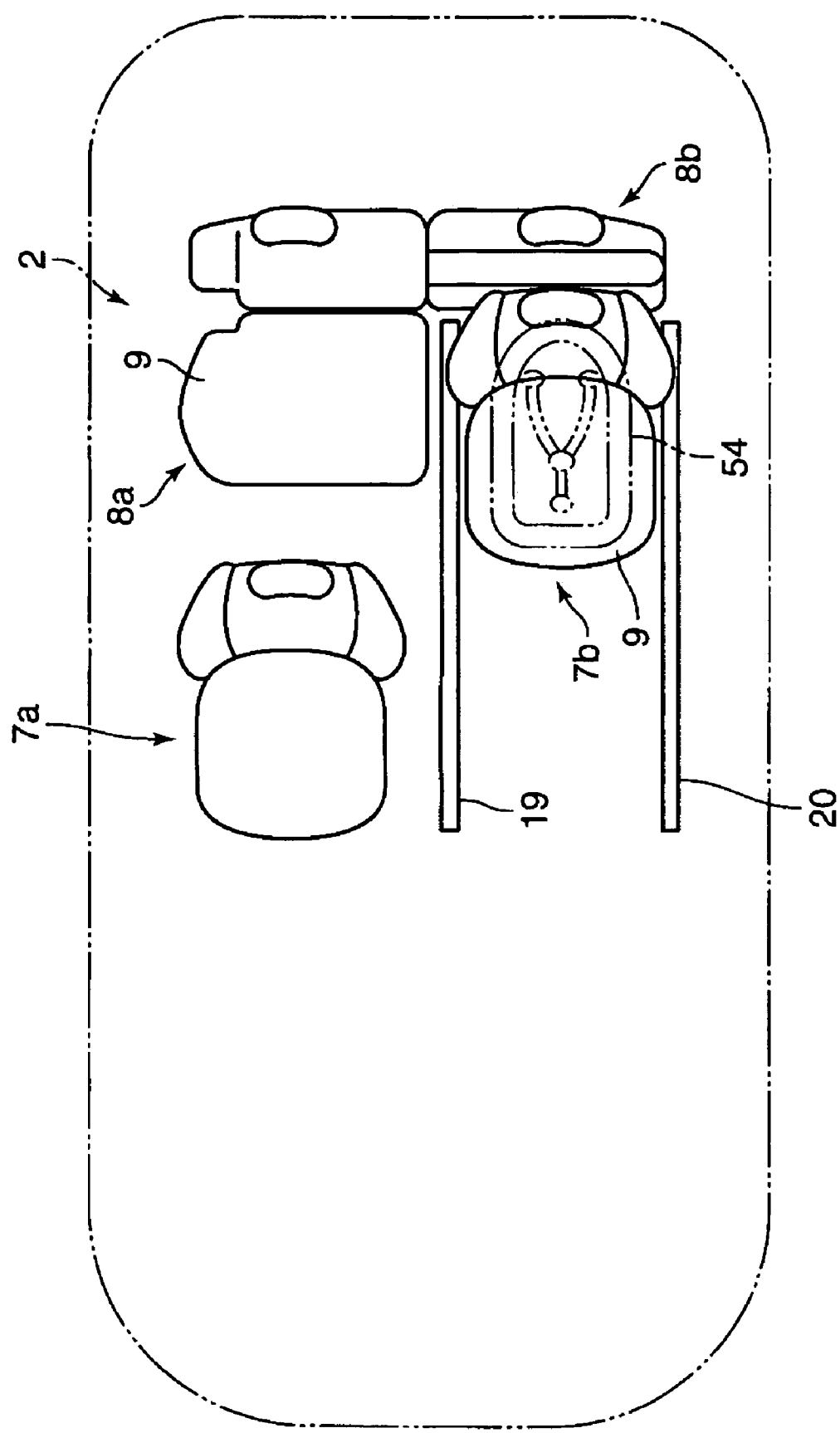
FIG. 18 is a plan view illustrating a disposition state of a child seat.

However, in the case where the independent seats 8*a* and 8*b* are stored separately like the above-described embodiment, the independent rear seat 8*a* behind the driver seat 7*a* remains in the normal use position and the assistant seat 7*b* is moved rearward to the position corresponding to the normal use position of the assistant-seat-side rear seat 8*b* in the stored position, which is beside the independent rear seat 8*a* as illustrated in FIG. 18. Accordingly, plural passengers can sit side by side on the assistant seat 7*b* and the independent rear seat 8*a*, with the large space formed in front of the assistant seat 7*b*.

Particularly, in the case where, by locating the assistant-seat-side rear seat 8*b* in the stored position and by moving the assistant seat 7*b* rearward, the both seat cushions 9, 9 of the assistant seat 7*b* and the independent rear seat 8*a* are located at substantially the same level so as to create a continuous sitting face thereby, the both seat cushions 9, 9 can be used integrally and thus the seat utility of the vehicle can be improved effectively. Herein, the assistant-seat-side rear seat 8*b* in the stored position may be moved rearward further than its normal use position, so that the more complete continuous sitting face can be created by the both seat cushions 9, 9.

Figure 19:
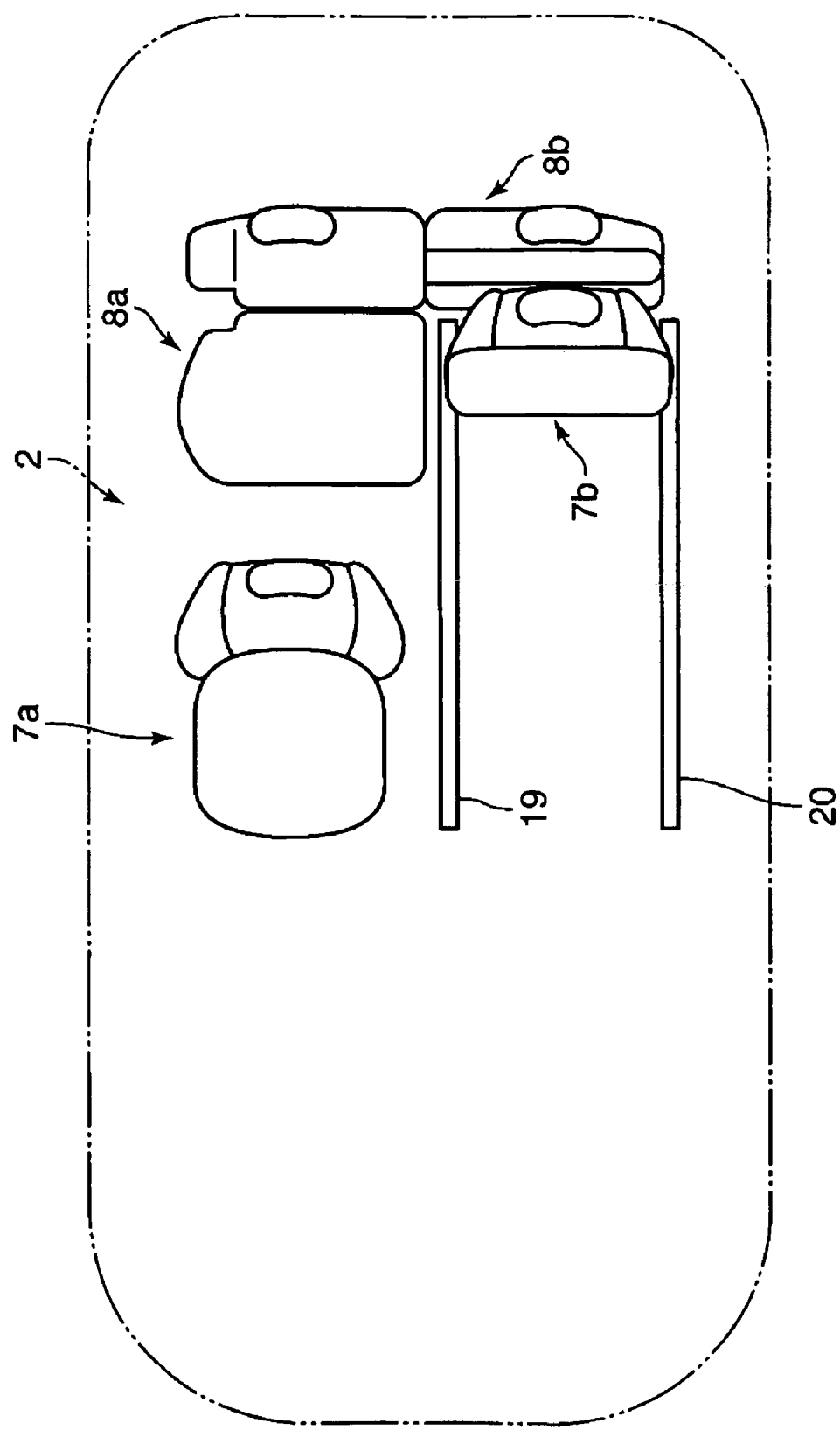
FIG. 19 is a plan view illustrating the state in which the assistant seat is moved rearward.

Also, since the assistant seat 7*b* is located in the stored position with the short longitudinal thickness by rotating the seat cushion 9 of the assistant seat 7*b* upward in the present embodiment, patterns of seat arrangement of the passenger seats 7 and 8 can be increased effectively. For example, as illustrated in FIG. 19, by locating both the assistant seat 7*b* and the assistant-seat-side rear seat 8*b* in their stored positions and by moving the assistant seat 7*b* rearward to the position corresponding to the normal use position of the assistant-seat-side rear seat 8*b*, an extremely large space can be formed beside the driver seat 7*a*.

Figure 20:
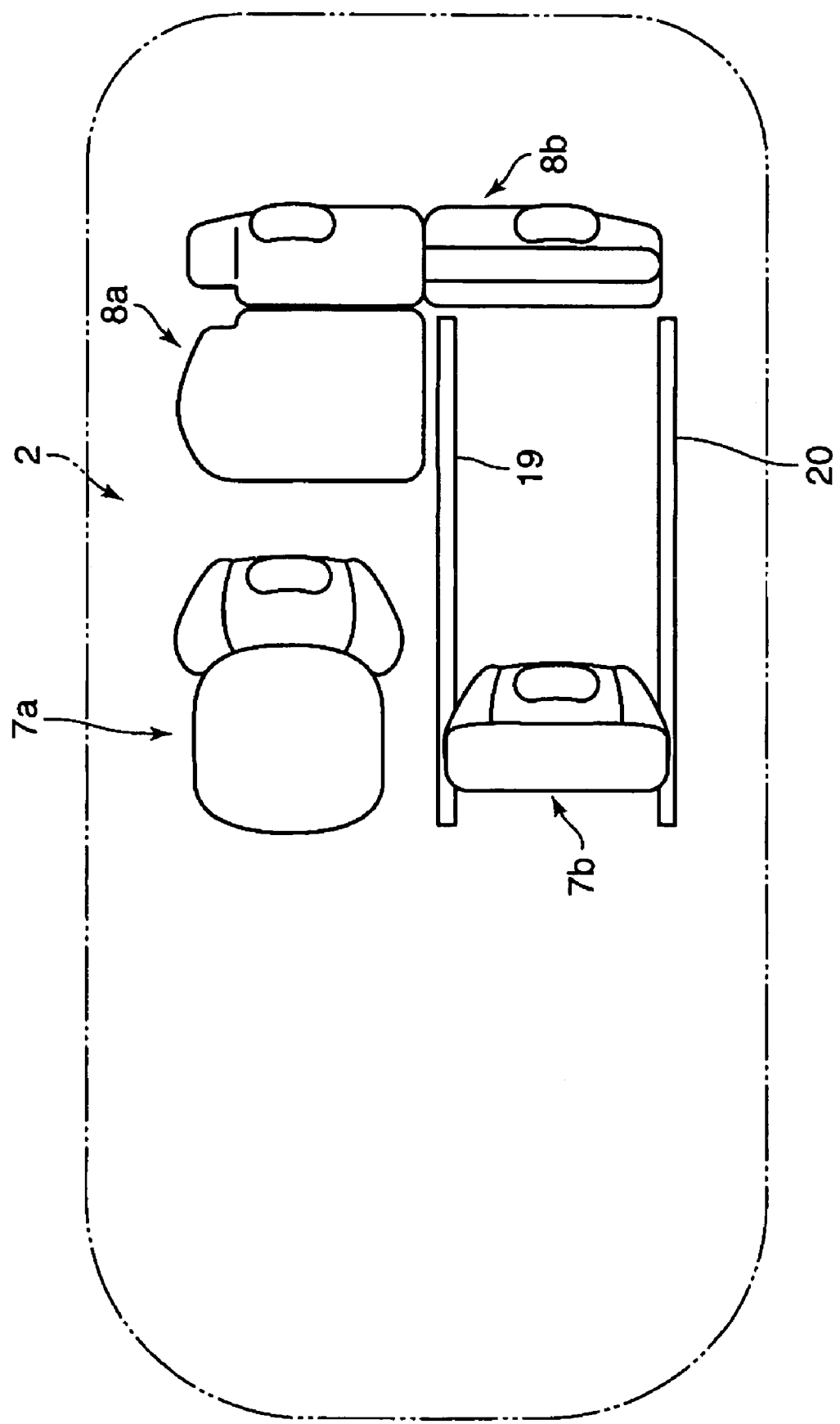
FIG. 20 is a plan view illustrating a state in which the assistant-seat-side rear seat is stored and the assistant seat is moved forward.

Particularly, in the case where the assistant seat 7*b* is moved forward closely to the instrument panel 43 with the seat cushion 9 in its stored position along the seat rail members 19 and 20 as illustrated in FIG. 14B, the large space can be formed in back of the assistant seat 7*b*. Thus, the riding of the passengers onto the rear seat 8 can be improved effectively. Also, as illustrated in FIG. 20, by moving the assistant seat 7*b* forward closely to the instrument panel 43 with the seat cushion 9 in its stored position and by locating the assistant-seat-side rear seat 8*b* in the stored position, the large space can be formed beside the driver seat 7*a* and the independent rear seat 8*a* located behind the driver seat 7*a*.

Also, in the case where a child seat 54 is available on the assistant seat 7*b* as illustrated by a broken line in FIG. 18, a proper seat arrangement which would make it easy for the passenger sitting on the independent rear seat 8*a* behind the deriver seat 7*a* to take care of a child in the child seat 54 can be provided, by moving the assistant seat 7*b* equipped with the child seat 54 to the position corresponding to the normal use position of the assistant-seat-side rear seat 8*b*. Also, the safety of the child seat can be improved by locating the child seat 54 at the rear of the vehicle.

Also, in the vehicle, like the above-described embodiment, having the plural ingress and egress openings 1*a* and 1*b* at the side faces of the cabin 2, as illustrated in FIGS. 14A and 18, the passengers can make access to the driver seat 7*a* and the assistant seat 7*b* from various directions, with the assistant seat 7*b* located in the position corresponding to the normal use position of the assistant-seat-side rear seat 8*b*. Accordingly, the riding of the passengers can be improved effectively.

Figure 21:
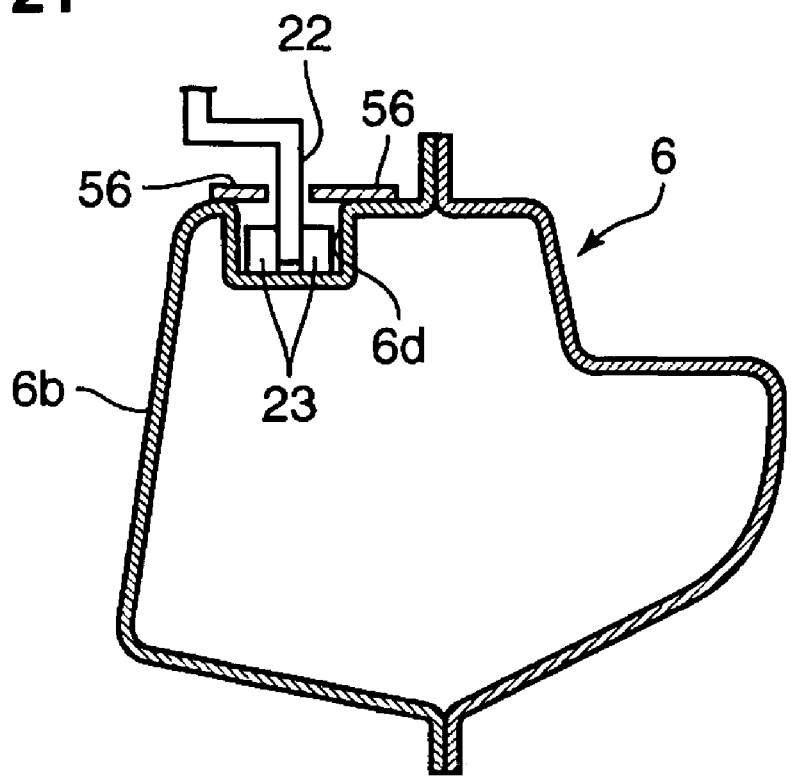
FIG. 21 is a sectional elevation view illustrating a modified disposition structure of the seat rail member.
Figure 22:
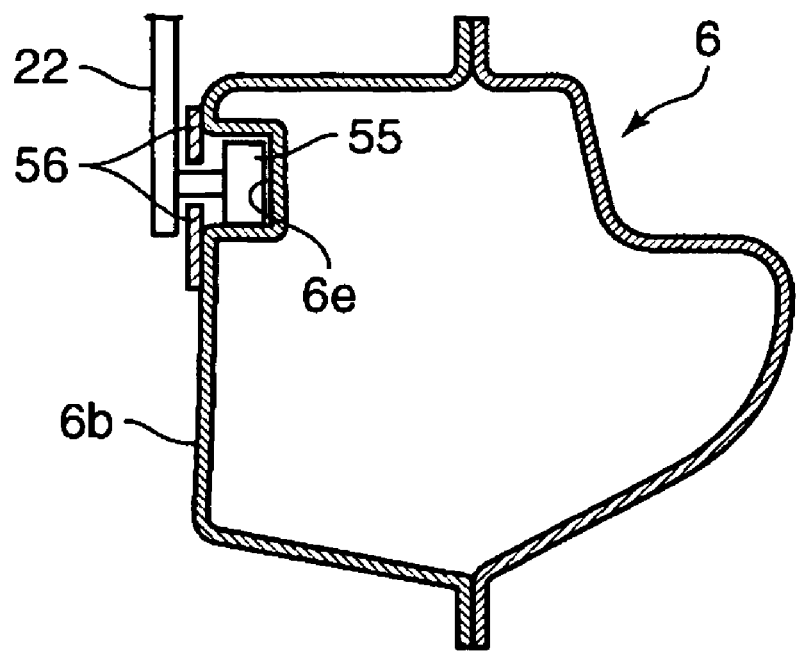
FIG. 22 is a sectional elevation view illustrating further another modified disposition structure of the seat rail member.

Also, instead of the above-described embodiment in which the seat rail member 20 is located in the recess portion 6*c* formed along the inside edge of the upper face of the inner panel 6*b* of the side sill 6, the slide rollers 23, 23 rotatably provided at the lower end of the slide plate 22 may be located in a recess portion 6*d* formed along the upper face of the inner panel 6*b* as illustrated in FIG. 21, or a slide roller 55 rotatably provided at the lower end of the slide plate 22 may be located in a recess portion 6*e* formed along the side face of the inner panel 6*b* as illustrated in FIG. 22. Thus, these recess portions 6*d* or 6*e* may be used as the seat rail members. In these cases, simpler and lighter structures can be provided. Herein, it may be preferable that engagement plates 56, 56 are provided respectively in order to prevent the slide rollers 23 and 25 from disengaging with the recess portions 6*d* or 6*e*.

Figure 23:
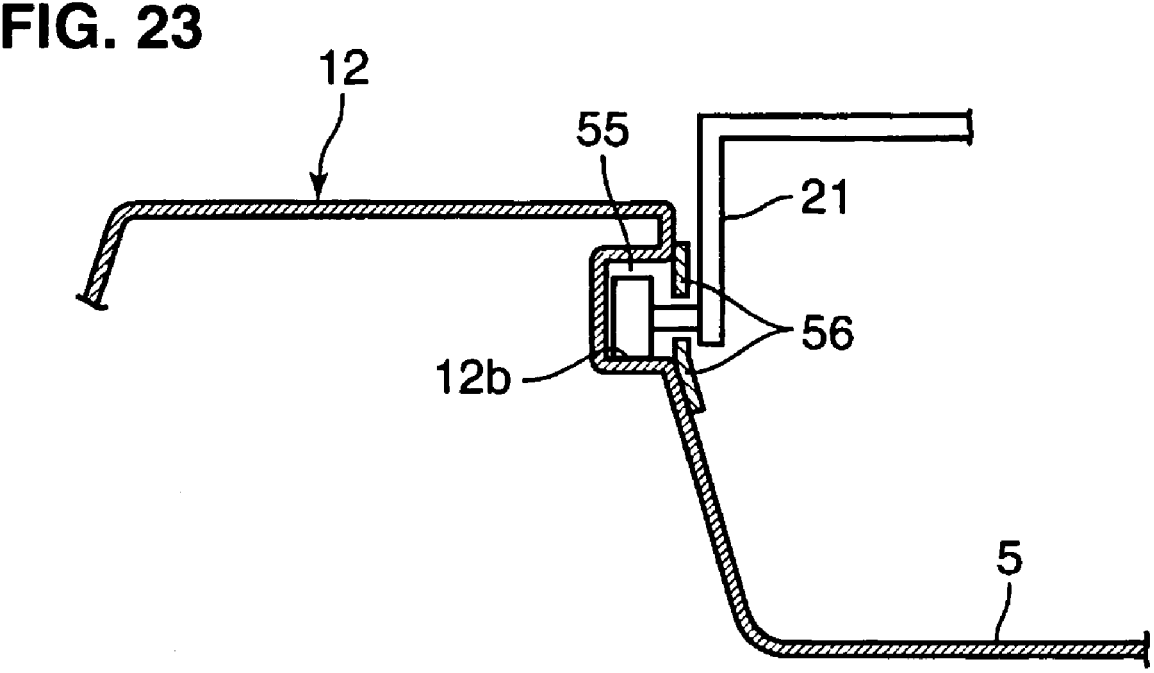
FIG. 23 is a sectional elevation view illustrating further another modified disposition structure of the seat rail member.
Figure 24:
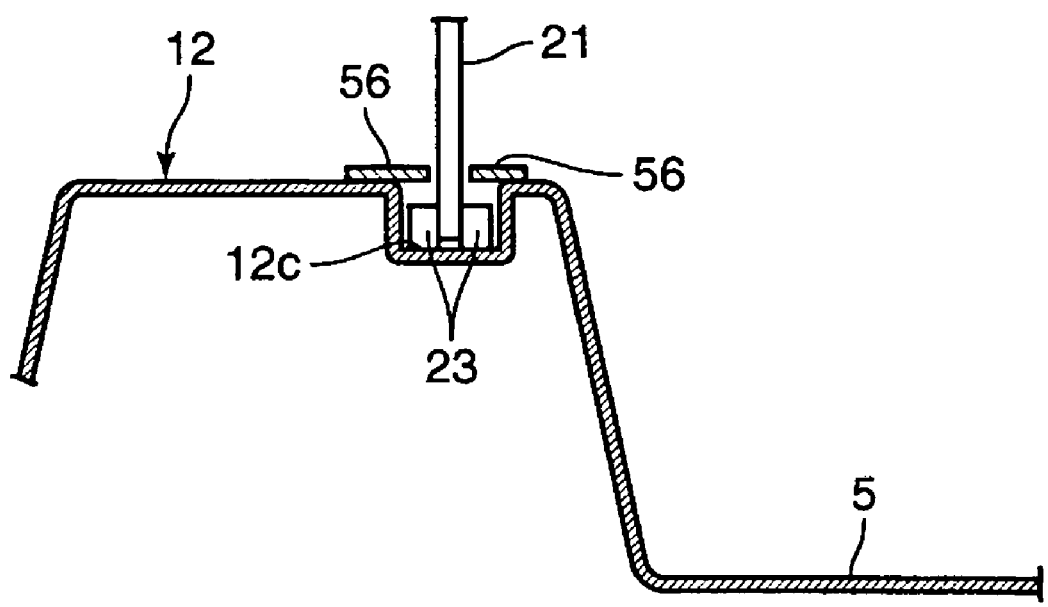
FIG. 24 is a sectional elevation view illustrating further another modified disposition structure of the seat rail member.

Further, the slide roller 55 rotatably provided at the lower end of the slide plate 21 may be located in a recess portion 12*b* formed along the side face of the above-described tunnel portion 12 as illustrated in FIG. 23. Or, the slide rollers 23, 23 rotatably provided at the lower end of the slide plate 21 may be located in a recess portion 12*a* formed at the inside edge portion of the upper face of the slide plate 21 as illustrated in FIG. 24. Thus, these recess portions 12*b* or 12*a* may be used as the seat rail members.

The vertical movement of the slide plate 21 with its lower end being inserted in the recess portion 12*b* is restrained by using the recess portion 12*b* formed along the side face of the tunnel portion 12 as the seat rail member as illustrated in FIG. 23. And, the lateral movement of the slide plate 22 with its lower end being inserted in the recess portion 6*d* is restrained by using the recess portion 6*d* formed along the upper face of the inner panel 6*b* as the seat rail member as illustrated in FIG. 21. In these cases, particularly, there may be no need to provide the engagement plate 56 to engage the lower ends of the slide plates 21 and 22 in the recess portions 12*b* and 6*b*, and thus the assistant seat 7*b* is movable in the longitudinal direction of the vehicle properly, preventing the seat 7*b* from disengaging with the seat rail members.

Also, the lateral movement of the slide plate 21 with its lower end being inserted in the recess portion 12*c* is restrained by using the recess portion 12*c* formed along the upper face of the tunnel portion 12 as the seat rail member as illustrated in FIG. 24. And, the vertical movement of the slide plate 22 with its lower end being inserted in the recess portion 6*e* is restrained by using the recess portion 6*e* formed along the side face of the inner panel 6*b* as the seat rail member as illustrated in FIG. 22. In these cases, likewise, there may be no need to provide the engagement plate 56 and thus the assistant seat 7*b* can be movable in the longitudinal direction of the vehicle properly, preventing the seat 7*b* from disengaging with the seat rail members.

Figure 25:
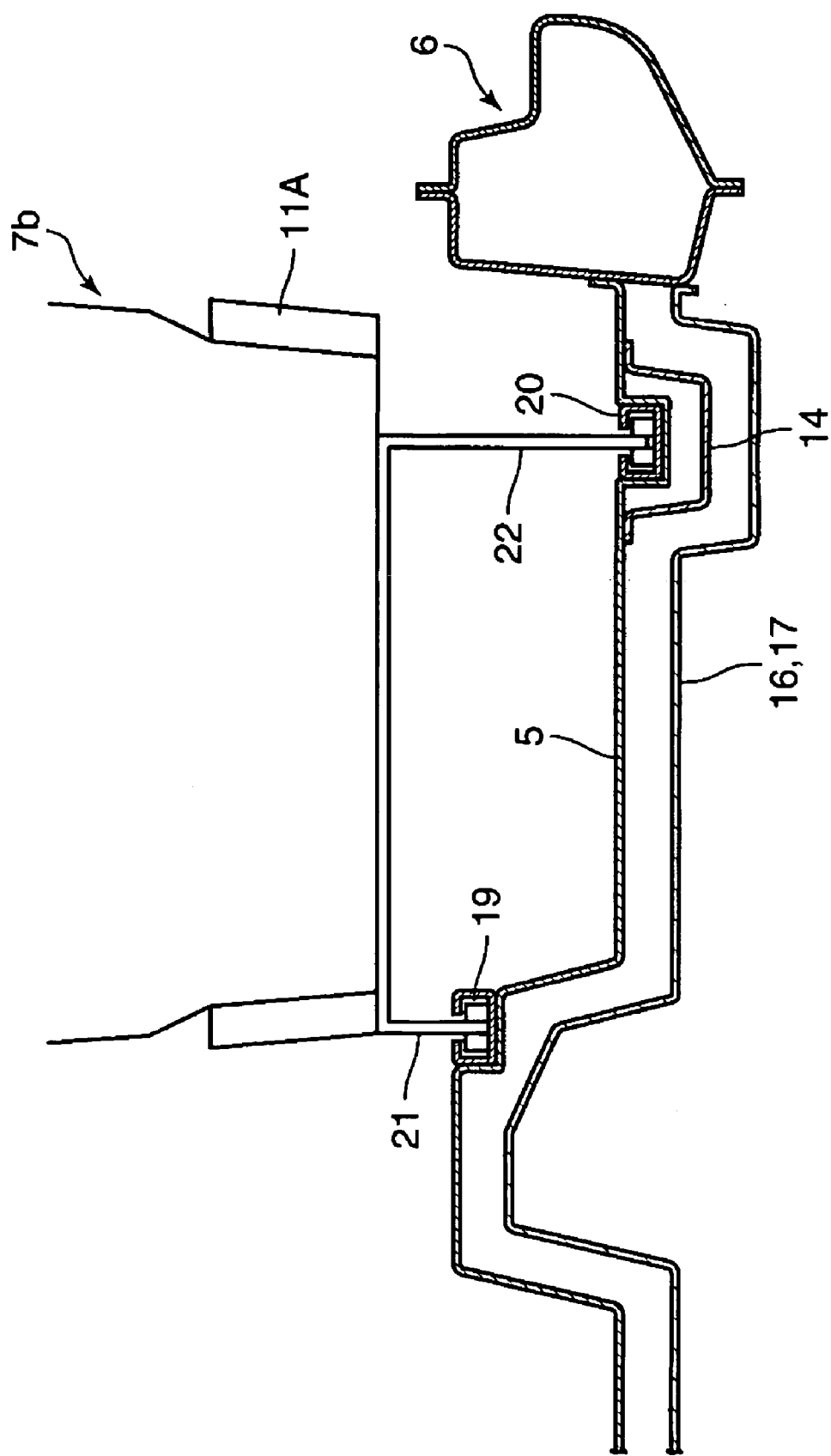
FIG. 25 is a sectional elevation view illustrating further another modified disposition structure of the seat rail member.

Herein, instead of the above-described embodiment in which the seat rail member 20 is provided along the inner edge portion of the upper face of the inner panel 6*b* of the side sill 6, the seat rail member 20 may be located on the upper surface of the floor panel 5 as illustrated in FIG. 25. In this case, it may be preferable to ensure a sufficient supporting rigidity of the seat rail member 20, by providing the seat rail member 20 at a portion where the floor frame 14 extending longitudinally at the lower face of the floor panel 5 as the rigidity member is disposed. Also, in the case where the seat rail member 20 is provided on the upper face of the floor panel 5 so as to extend in the longitudinal direction, it may be preferable that the floor cross members 16 and 17 are provided at the lower face of the floor panel 5 because it would be difficult that the members 16 and 17 are provided at the upper face of the floor panel 5.

Also, in the vehicle or the like in which there is provided no tunnel portion 12 extending in the longitudinal direction at the central portion of the floor panel 5, the seat rail member supporting the inner side edge portion of the assistant seat 7*b*, i.e., the seat rail member which is made of a groove-shaped steel member and rotatably support the slide roller 23 provided at the lower end of the slide plate 19, may be provided on the upper face of the floor panel 5. Accordingly, the seat rail member can be provided at any portions properly.

Further, in the above-described embodiment, the assistant-seat-side rear seat 8*b* is configured such that the cushion seat 9 thereof is rotated upward to the stored position, according to the rearward-movement operation of the assistant seat 7*b*, by the drive mechanism comprising the biasing means 41 including the torsional spring to resiliently bias the seat cushion 9 upward, the drive lever 37 and the wire 38 which release the engagement of the seat cushion 9 by the lock means including the lock arm 36 and the striker 39. Accordingly, without passenger's troublesome (complicated) operations of holding the cushion seat 9 of the assistant-seat-side rear seat 8*b* and then rotating it upward from the outside of the vehicle after getting off, the assistant seat 7*b* can be moved rearward to the above-described position after moving the assistant-seat-side rear seat 8*b* to the stored position just while sitting on the assistant seat 7*b*.

Also, sine the rearward-movement of the assistant seat 7*b* is limited by the stopper mechanism 25 at the point which is slightly before the seat cushion 9 of the rear-row seat 8 located in the normal use position in the present embodiment, the assistant seat 7*b* can be effectively prevented from contacting knees or the like of the passenger sitting on the assistant-seat-side rear seat 8*b*.

Further, in the case where the assistant-seat-side rear seat 8*b* is configured such that its longitudinal thickness is made short by rotating the seat cushion 9 of the assistant-seat-side rear seat 8*b* upward like the above-described embodiment, the longitudinal thickness of the assistant-seat-side rear seat 8*b* can be made short very easily by just rotating the cushion 9 around the support axis 40 provided at the support member 11B.

Also, since the plural independent seats 8*a* and 8*b* are provided and they are separately stored in their stored positions, the independent rear seat 8*a* behind the driver seat 7*a* remains in the normal use position and the assistant seat 7*b* is moved rearward to the position corresponding to the normal use position of the assistant-seat-side rear seat 8*b* in the stored position. Thus, the assistant seat 7*b* can be located beside the independent rear seat 8*a* as illustrated in FIG. 16. Accordingly, plural passengers can sit side by side on the assistant seat 7*b* and the independent rear seat 8*a*, with the large space formed in front of the assistant seat 7*b*.

Further, in the vehicle in which the front-row seat (substantially a middle seat) comprising the driver seat 7*a* and the assistant seat 7*b* and the rear-row seat 8*b* located behind the front seat in the cabin 2, there may be provided the structure in which the rear-row seat 8*b* is configured so as to be located in the normal use position and in the stored position with the short longitudinal thickness, the front seat (the middle seat) is configured so as to be moved to the position corresponding to the normal use position of the rear-row seat 8*b*, and the drive mechanism to move the rear seat to the stored position according to the rearward-movement operation of the front-row seat. In this case, the patterns of seat arrangement of the passenger seats can be increased effectively.

Figure 26:
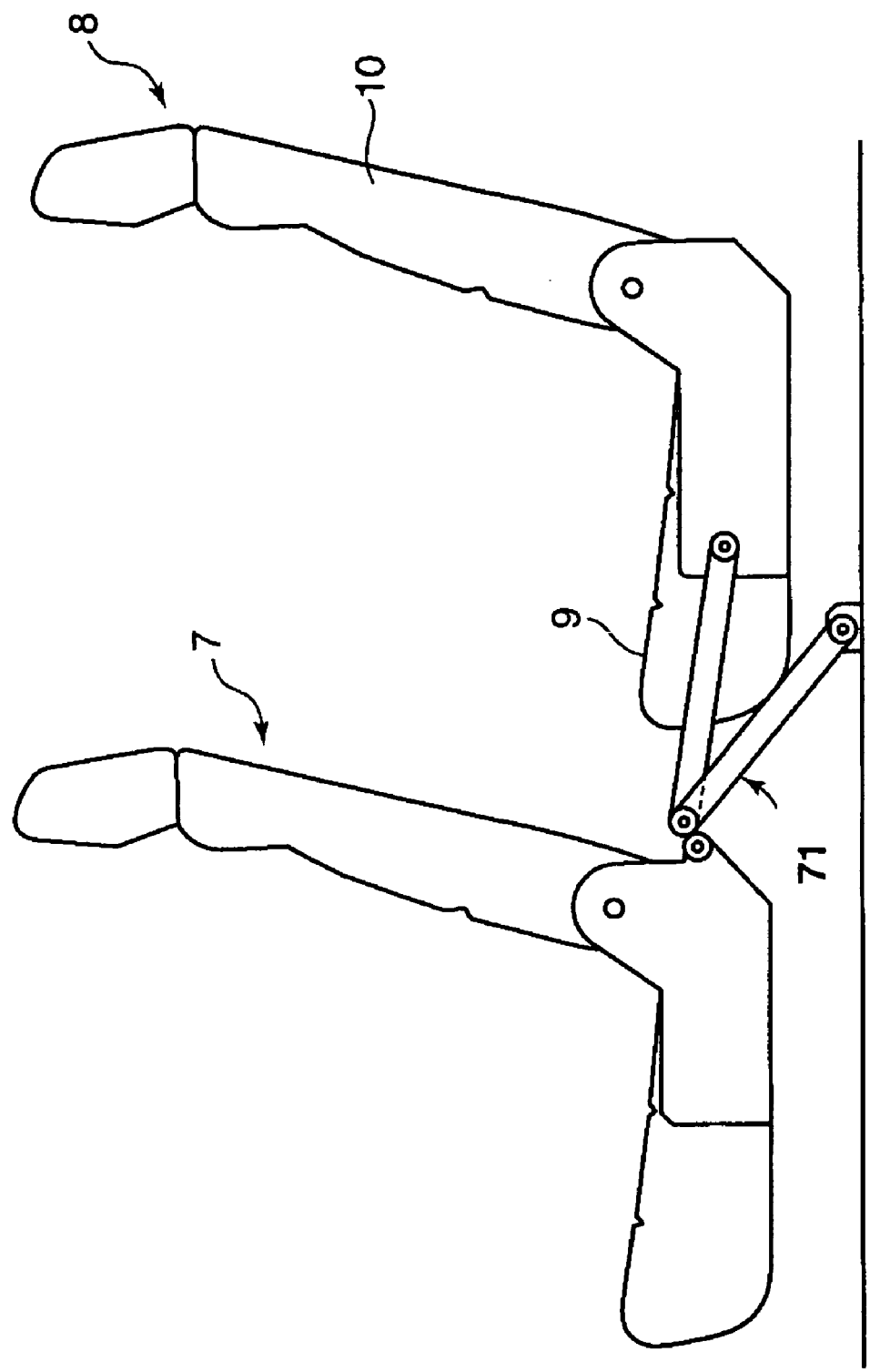
FIG. 26 is a side view illustrating further anther embodiment of the present invention.
Figure 27:
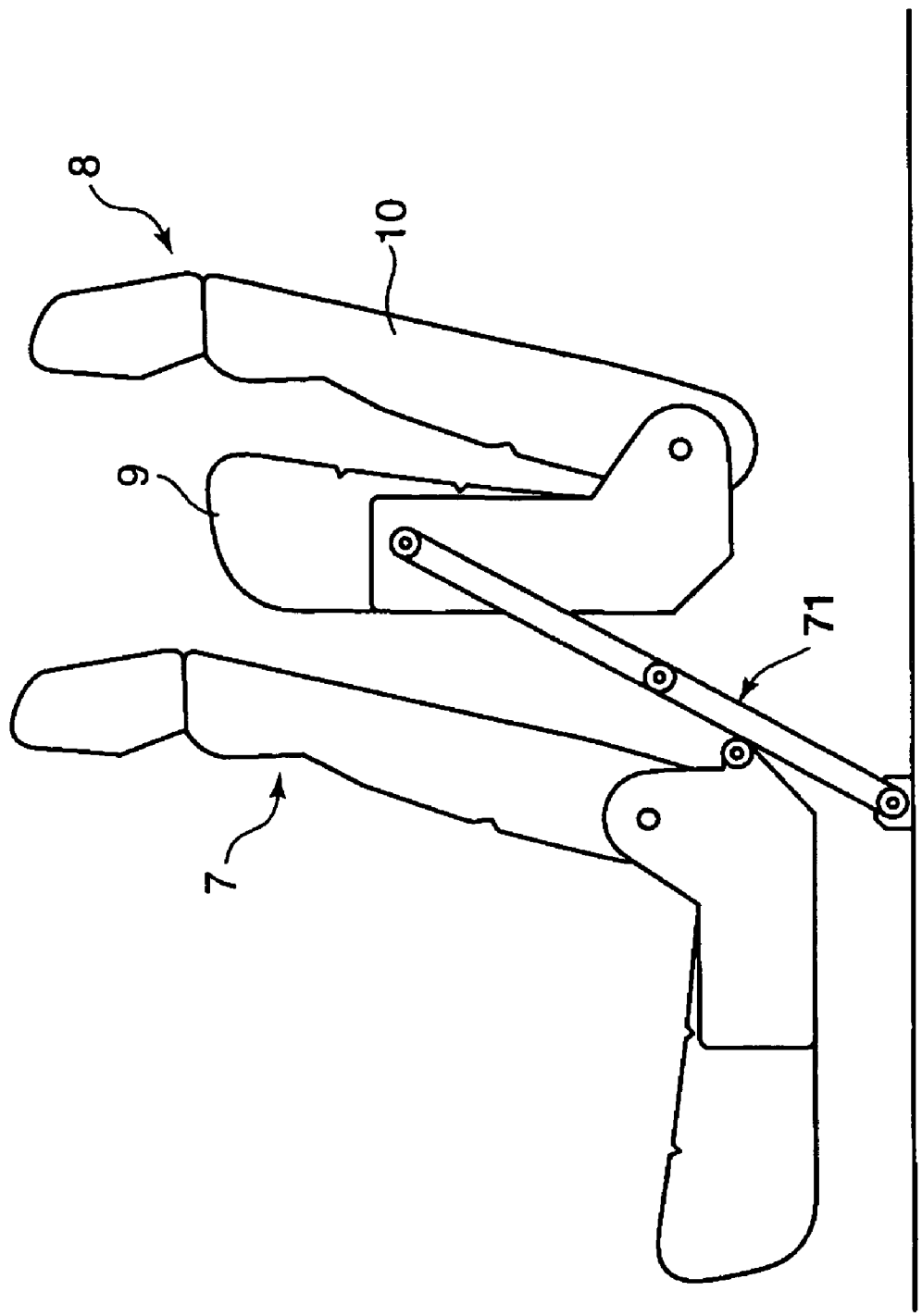
FIG. 27 is a side view illustrating a state in which a front-row seat is moved rearward.

Herein, instead of the above-described embodiment in which the seat cushion 9 of the assistant-seat-side rear seat 8*b* is rotated upward to the stored position by the biasing force of the basing means 41 or in addition to the above structure, the rear-row seat 8*b* may be configured so as to be moved to the stored position by a drive link 71 which is provided so as to expand as illustrated in FIGS. 26 and 27.

Further, Further, there may be provided an electric drive mechanism or a drive cylinder which rotates the cushion 9 of the rear-row seat 8*b* upward automatically to the stored position based on output signals of a detecting means which detects the rearward-movement operation of the assistant seat 7*b*.

Figure 28:
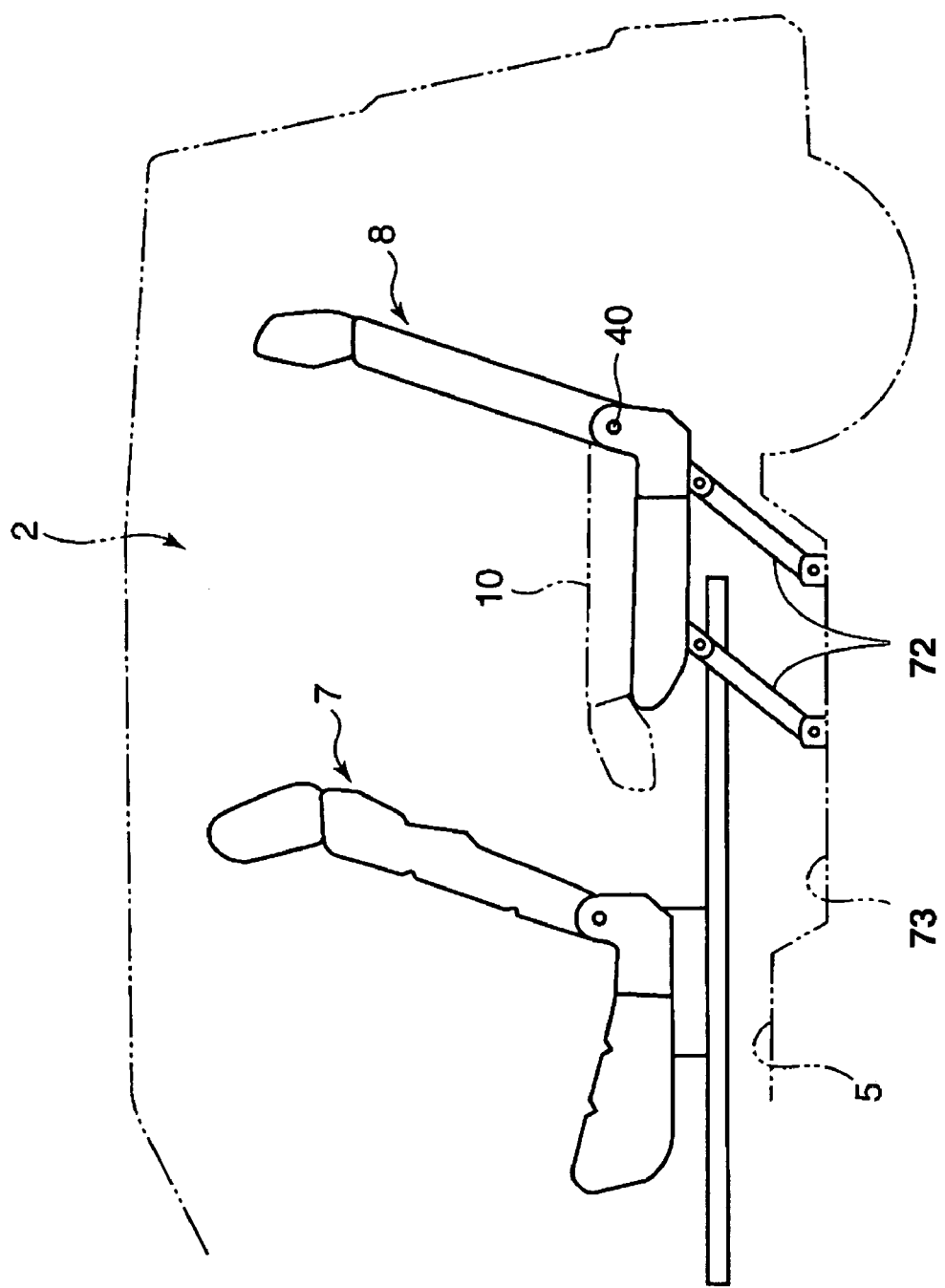
FIG. 28 is a side view illustrating further another embodiment of the present invention.
Figure 29:
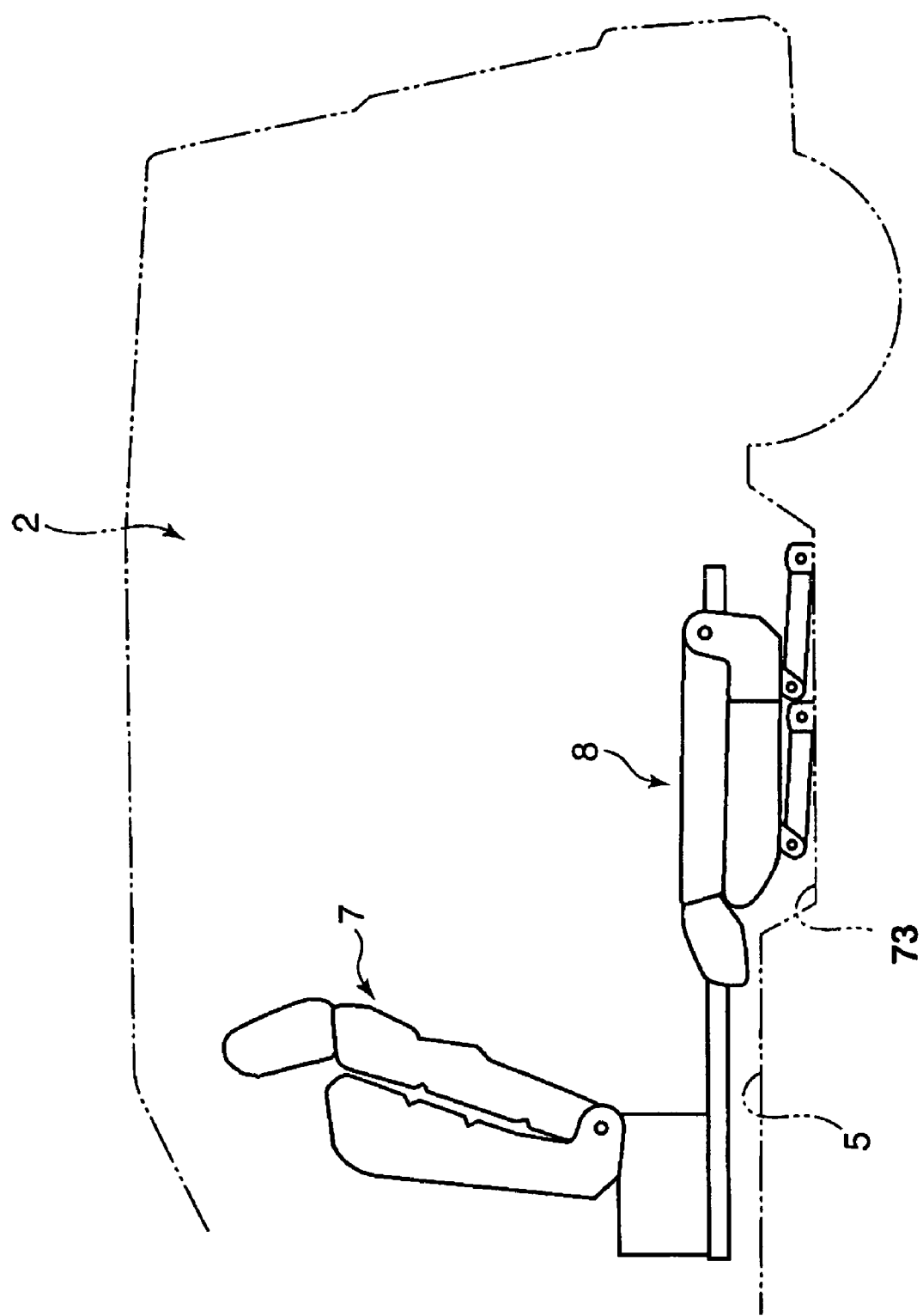
FIG. 29 is a side view illustrating a state in which a rear-row seat is stored at a lower portion of the vehicle.

Also, the seat back 10 of the rear-row seat 8*b* may be supported by the support axis 40 so as to be rotated forward and folded on the seat cushion 9 as illustrated by a broken line in FIG. 28, and there may be provided a support link 72 to rotatably support the seat cushion 9. And, when the rear-row seat 8*b* with the seat back 10 folded on the seat cushion 9 is rotated forward by the support link 72 with the assistance of the electric drive mechanism or the drive cylinder (not illustrated), the assistant-seat-side rear seat 8*b* may be located and stored in a storing recess 73 formed at the floor panel 5 as illustrated in FIG. 29. In this case, since the assistant seat 7*b* is allowed to be moved rearward further to the position where the assistant-seat-side rear seat 8*b* in the stored position is located, the rearward-movement range of the assistant seat 7*b* can be further enlarged.

The present invention should not be limited to the above-described embodiments, but any other modifications and improvements may be applied within the range of a spirit of the present invention.

What is claimed is:

1. A seat device for a vehicle, comprising:
   a front-row seat including a driver seat and an assistant seat;
   a rear-row seat provided behind said front-row seat, the rear-row seat comprising a seat cushion and a seat back;
   respective front-row and rear-row seats being provided in a cabin which includes an ingress and egress opening at a side face,
   wherein said rear-row seat is configured so as to be respectively located in a normal use position where the seat cushion thereof is disposed substantially horizontally and in a stored position where the seat cushion thereof is rotated upward and a longitudinal thickness thereof is made short, and said assistant seat is configured so as to be moved rearward from a position beside said driver seat to a position just in front of the rear-row seat located in the stored position, wherein said seat cushion of the rear-row seat is pivotally supported at a seat support member and biased by a biasing means provided at the seat support member so that the rear-row seat can take said stored position where the seat cushion thereof is rotated upward with a biasing force of said biasing means, said seat cushion of the rear-row seat is configured to be engaged with a lock member provided on a side of a vehicle floor so that the rear-row seat can take said normal use position where the seat cushion thereof is in a substantially horizontal position against the biasing force of said means, and there is provided a releasing mechanism that releases an engagement of the seat cushion of the rear-row seat with said lock member when said assistant seat is moved rearward to a specified position, whereby said assistant seat can be allowed to be moved rearward to said position just in front of the rear-row seat located in the stored position when the rear-row seat is changed from the normal use position to the stored position according to a release operation of the engagement of the seat cushion of the rear-row seat by said releasing mechanism.

2. The seat device for a vehicle of claim 1, wherein there are provided a plurality of independent rear seats, and the independent rear seats are configured so as to be located in stored positions thereof separately.

3. The seat device for a vehicle of claim 1, wherein said assistant seat is configured so as to be located in a stored position where a longitudinal thickness thereof is made short with a seat cushion of said assistant seat being rotated upward.

4. The seat device for a vehicle of claim 1, wherein there is provided a seat rail member which supports said assistant seat so as to move the assistant seat rearward from said position beside said driver seat to said position just in front of the rear-row seat located in the stored position.

5. The seat device for a vehicle of claim 4, wherein said seat rail member includes a seat rail member to support an outside edge portion of said assistant seat, and said seat rail member supporting the outside edge portion of the assistant seat is provided at a side sill which extends in a longitudinal direction of the vehicle at a side portion of the vehicle.

6. The seat device for a vehicle of claim 5, wherein said scat rail member supporting the outside edge portion of the assistant seat is located in a recess portion which is formed at ma inner panel of said side sill.

7. The seat device for a vehicle of claim 4, wherein said seat rail member includes a seat rail member to support an inside edge portion of said assistant seat, and said seat rail member supporting the inside edge portion of the assistant seat is provided at a tunnel portion which extends in a longitudinal direction of the vehicle at a central portion of the vehicle.

8. The seat device for a vehicle of claim 1, wherein there is provided a drive mechanism which moves said rear-row seat to said stored position along with a rearward-movement operation of said assistant seat.

9. The seat device for a vehicle of claim 8, wherein there is provided a stopper mechanism which limits a rearward movement of said assistant seat at a point which is close to a seat cushion of the rear-row seat located in said normal use position.

10. The seat device for a vehicle of claim 1, wherein said lock member comprises a lock arm that is rotatably supported on the vehicle floor so as to be engaged with a striker provided at the seat cushion of the rear-row seat, and said releasing mechanism comprises a drive member that is provided so as to be rotated when the assistant seat is moved rearward to said specified position and a connecting member that operationally connects said drive member with said lock member, whereby a rotation of the drive member is transmitted to the lock arm via the connecting member so that the engagement of the seat cushion of the rear-row seat with respect to the vehicle floor can be released.

11. The seat device for a vehicle of claim 10, wherein said drive member is configured to be rotated according to a rearward movement of said assistant seat.

12. The seat device for a vehicle of claim 11, wherein there is further provided a stopper mechanism that comprises a stopper member to limit a rearward movement of the assistant seat to a specified limit position and an operation lever that disables a limitation by the stopper mechanism, and the rotation of said drive member of the releasing mechanism is restricted by the stopper member of the stopper mechanism.

13. The seat device for a vehicle of claim 3, wherein said assistant seat located in said stored position is configured so as to be moved forward closely to an instrument panel.

14. The seat device for a vehicle of claim 1, wherein a child seat is available on said assistant seat.

15. The seat device for a vehicle of claim 1, wherein there is provided a seat belt mechanism which is configured so as to be applicable to passengers sitting on said rear-row seat and said assistant seat located in said rearward-moved position.

16. The seat device for a vehicle of claim 15, wherein said seat belt mechanism comprises a retractor which retracts a seat belt, an anchor which supports the seat belt from said retractor at an upper side of the vehicle, and a buckle which fixes a front end of the seat belt to a vehicle body, and said seat belt mechanism is located so as to protect the passengers sitting on said rear-row seat and said assistant seat located in said rearward-moved position.

17. The seat device for a vehicle of claim 5, wherein a recess portion which is formed at an inner panel of said side sill is used as said seat rail member supporting the outside edge portion of the assistant seat.

18. The seat device for a vehicle of claim 4, wherein said seat rail member includes a seat rail member to be provided at a portion of a floor panel, at which a floor frame which extends in a longitudinal direction of the vehicle is provided.

19. The seat device for a vehicle of claim 18, wherein there is provided a floor cross member which extends in a vehicle width direction is provided at a lower face of said floor panel.

* * * * *